US012618592B2

(12) United States Patent
Kobayashi et al.

(10) Patent No.: US 12,618,592 B2
(45) Date of Patent: May 5, 2026

(54) HEAT GENERATION DEVICE, HEAT UTILIZATION SYSTEM AND FILM-LIKE HEAT GENERATION ELEMENT

(71) Applicant: CLEAN PLANET INC., Tokyo (JP)

(72) Inventors: Atsushi Kobayashi, Tokyo (JP); Yasuhiro Iwamura, Miyagi (JP); Takehiko Ito, Toyo (JP); Jirota Kasagi, Miyagi (JP); Hideki Yoshino, Tokyo (JP); Shotaro Hirano, Tokyo (JP)

(73) Assignee: CLEAN PLANET INC., Tokyo (JP)

( * ) Notice: Subject to any disclaimer, the term of this patent is extended or adjusted under 35 U.S.C. 154(b) by 1022 days.

(21) Appl. No.: 17/778,141

(22) PCT Filed: Nov. 18, 2020

(86) PCT No.: PCT/JP2020/043076
§ 371 (c)(1),
(2) Date: Jul. 1, 2022

(87) PCT Pub. No.: WO2021/100784
PCT Pub. Date: May 27, 2021

(65) Prior Publication Data
US 2023/0003461 A1 Jan. 5, 2023

(30) Foreign Application Priority Data
Nov. 19, 2019 (JP) ................................ 2019-208483

(51) Int. Cl.
*F28D 20/00* (2006.01)
*F24V 30/00* (2018.01)
*G21B 3/00* (2006.01)

(52) U.S. Cl.
CPC .............. *F24V 30/00* (2018.05); *G21B 3/002* (2013.01)

(58) Field of Classification Search
CPC ........ F24V 30/00; F28C 20/003; Y02E 60/14; Y02E 60/32; F01K 3/188
See application file for complete search history.

(56) References Cited

U.S. PATENT DOCUMENTS

2020/0107470 A1* 4/2020 Archer ...................... G06F 1/20
2020/0208885 A1* 7/2020 Iwamura ............... C01B 3/0036
2021/0325119 A1* 10/2021 Kajiya ..................... H05B 3/24

FOREIGN PATENT DOCUMENTS

JP 852-92144 A 8/1977
JP H06-257864 A 9/1994
(Continued)

OTHER PUBLICATIONS

Akira Kitamura et al., "Excess heat evolution from nanocomposite samples under exposure to hydrogen isotope gases" International Journal of Hydrogen Energy 43, 2018, pp. 16187-16200 (14 pages).
(Continued)

*Primary Examiner* — Ko-Wei Lin
(74) *Attorney, Agent, or Firm* — Osha Bergman Watanabe & Burton LLP

(57) ABSTRACT

A heat generating device includes: a sealed container; a tubular body provided in a hollow portion of the sealed container; a heat generating element provided on an outer surface of the tubular body and configured to generate heat by occluding and discharging hydrogen supplied to the hollow portion; and a flow path formed by an inner surface of the tubular body and through which configured to allow a fluid that exchanges heat with the heat generating element to flow. The heat generating element includes a base made of a hydrogen storage metal, and a multilayer film provided on the base. The multilayer film has a first layer made of a hydrogen storage metal and having a thickness of less than 1000 nm, and a second layer made of a hydrogen storage
(Continued)

metal, which is different from that of the first layer, and having a thickness of less than 1000 nm.

10 Claims, 20 Drawing Sheets

(56) References Cited

FOREIGN PATENT DOCUMENTS

| | | | |
|---|---|---|---|
| JP | H11-72200 | A | 3/1999 |
| JP | 2001082697 | A | 3/2001 |
| JP | 2001289396 | A | 10/2001 |
| JP | 2004-25012 | A | 1/2004 |
| JP | 2004-53208 | A | 2/2004 |
| JP | 2004-077200 | A | 3/2004 |
| JP | 2016017542 | A | 2/2016 |
| JP | 2018/062115 | A1 | 4/2018 |
| JP | 6548102 | B2 | 7/2019 |
| JP | 6696096 | B2 | 5/2020 |
| JP | 6749035 | B1 | 9/2020 |
| WO | 00/77266 | A1 | 12/2000 |
| WO | 2015/008859 | A2 | 1/2015 |
| WO | 2018/230447 | A1 | 12/2018 |
| WO | 2020/122097 | A1 | 6/2020 |
| WO | 2020/122098 | A1 | 6/2020 |

OTHER PUBLICATIONS

International Search Report issued in corresponding International Application No. PCT/JP2020/043076 mailed Dec. 22, 2020 (6 pages).

Written Opinion issued in corresponding International Application No. PCT/JP2020/043076 mailed Dec. 22, 2020 (5 pages).

Office Action issued in corresponding Brazilian Patent Application No. BR112022009628-3, dated Sep. 10, 2024, with partial machine translation (7 pages).

Office Action issued in corresponding Korean Patent Application No. 10-2022-7020309, dated Jul. 29, 2025, with translation (16 pages).

* cited by examiner

| | SH inlet | SH out / EVA in | EVA out / ECO in | ECO out |
|---|---|---|---|---|
| boiler air temperature | 700 | 565 | 376 | 300 |
| boiler steam temperature | 560 | 331 | 331 | 250 |

HEAT GENERATION DEVICE, HEAT UTILIZATION SYSTEM AND FILM-LIKE HEAT GENERATION ELEMENT

TECHNICAL FIELD

The present invention relates to a heat generating device, a heat utilization system, and a film-shaped heat generating element.

BACKGROUND ART

In recent years, a heat generation phenomenon in which heat is generated by occluding and discharging hydrogen using a hydrogen storage metal or the like is reported (see, for example, NPL 1). Hydrogen can be generated from water and is thus inexhaustible and inexpensive as a resource, and does not generate a greenhouse gas such as carbon dioxide and is thus clean energy. Unlike a nuclear fission reaction, the heat generation phenomenon using the hydrogen storage metal or the like is safe since there is no chain reaction. Heat generated by occluding and discharging hydrogen can be utilized as it is, and can be further utilized by being converted into electric power. Therefore, the heat is expected as an effective energy source.

CITATION LIST

Non Patent Literature

NPL 1: A. Kitamura, A. Takahashi, K. Takahashi, R. Seto, T. Hatano, Y. Iwamura, T. Itoh, J. Kasagi, M. Nakamura, M. Uchimura, H. Takahashi, S. Sumitomo, T. Hioki, T. Motohiro, Y. Furuyama, M. Kishida, H. Matsune, "Excess heat evolution from nanocomposite samples under exposure to hydrogen isotope gases", International Journal of Hydrogen Energy 43 (2018) 16187-16200.

SUMMARY OF INVENTION

Technical Problem

However, an energy source is still mainly obtained from thermal power generation or nuclear power generation. Therefore, from the viewpoint of environmental problems and energy problems, there is a demand for a novel heat utilization system and heat generating device that utilize an inexpensive, clean, and safe energy source and that have not been disclosed in the related art.

Therefore, an object of the invention is to provide a novel heat generating device and heat utilization system that utilize an inexpensive, clean, and safe energy source, and a film-shaped heat generating element as an inexpensive, clean, and safe energy source.

Solution to Problem

A heat generating device according to the invention includes: a hollow sealed container; a tubular body provided in a hollow portion formed by an inner surface of the sealed container; a heat generating element provided on an outer surface of the tubular body and configured to generate heat by occluding and discharging hydrogen contained in a hydrogen-based gas supplied to the hollow portion; and a flow path formed by an inner surface of the tubular body and through which configured to allow a fluid that exchanges heat with the heat generating element to flow. The heat generating element includes a base made of a hydrogen storage metal, a hydrogen storage alloy, or a proton conductor, and a multilayer film provided on the base. The multilayer film has a first layer made of a hydrogen storage metal or a hydrogen storage alloy and having a thickness of less than 1000 nm, and a second layer made of a hydrogen storage metal or a hydrogen storage alloy, which is different from that of the first layer, or ceramics and having a thickness of less than 1000 nm.

A heat utilization system according to the invention includes the above-described heat generating device; and a fluid utilization device that utilizes the fluid heated by the heat generating element.

A film-shaped heat generating element according to the invention includes: a film-shaped base made of a hydrogen storage metal, a hydrogen storage alloy, or a proton conductor; and a film-shaped multilayer film provided on the base. The multilayer film has a first layer made of a hydrogen storage metal or a hydrogen storage alloy and having a thickness of less than 1000 nm, and a second layer made of a hydrogen storage metal or a hydrogen storage alloy, which is different from that of the first layer, or ceramics and having a thickness of less than 1000 nm.

Advantageous Effects of Invention

According to the invention, since the heat generating element that generates heat by occluding and discharging hydrogen is utilized as an energy source, inexpensive, clean, and safe energy can be supplied.

DESCRIPTION OF EMBODIMENTS

First Embodiment

Figure 1:
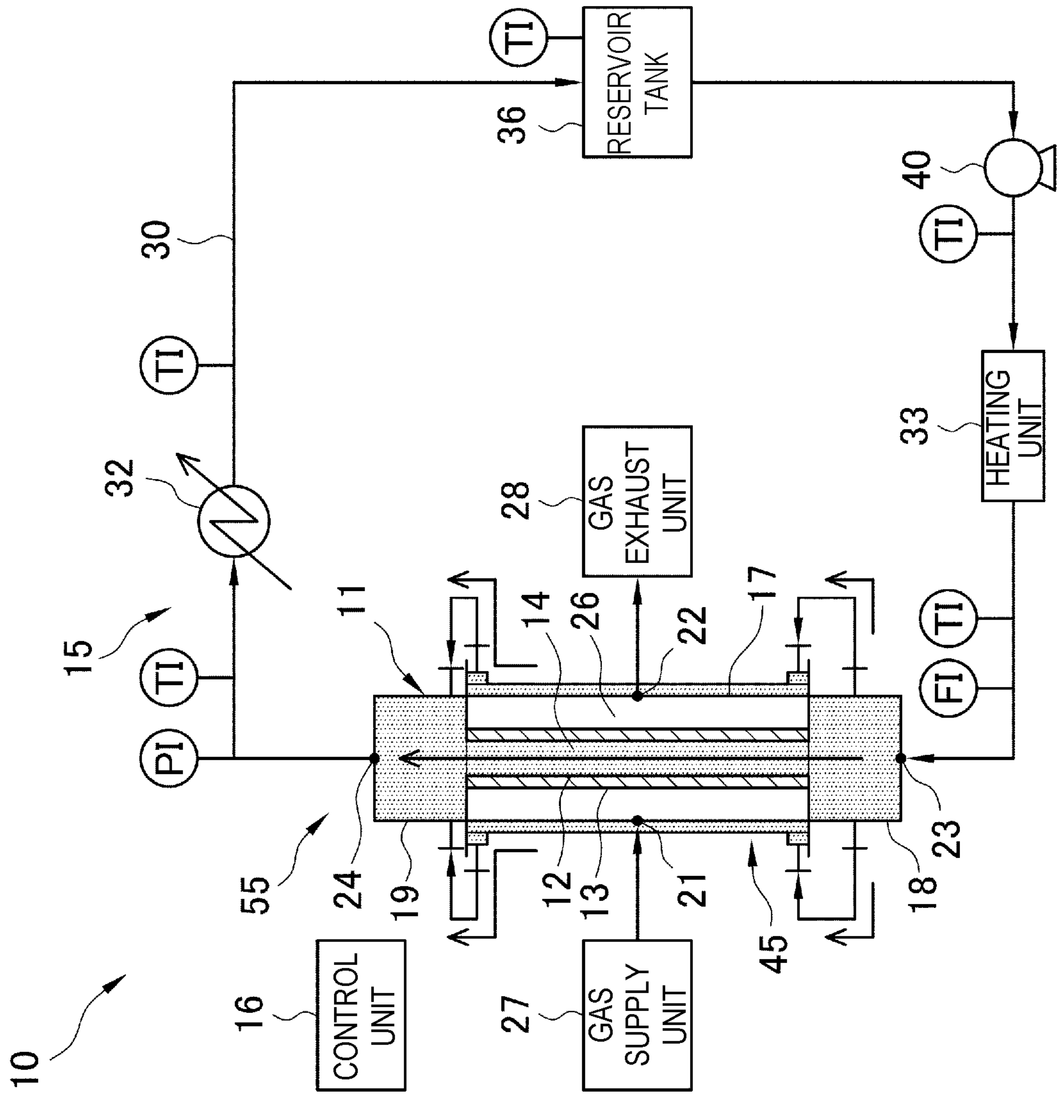
FIG. 1 is a schematic diagram showing a heat generating device according to a first embodiment.

In FIG. 1, a heat generating device 10 includes a sealed container 11, a tubular body 12, a heat generating element 13, a flow path 14, a fluid circulation unit 15, and a control unit 16. In the heat generating device 10, the heat generating element 13 is provided outside the tubular body 12, the flow path 14 is provided inside the tubular body 12, and a fluid flowing through the flow path 14 is heated by the heat generating element 13 to generate a high-temperature fluid.

The fluid includes at least one of a liquid and a gas. As the fluid, a fluid excellent in thermal conductivity and chemically stable is preferable. Examples of the gas include helium gas, argon gas, chlorofluorocarbon gas, hydrogen gas, nitrogen gas, water vapor, air, and carbon dioxide. Examples of the liquid include water, a molten salt (such as $KNO_3$ (40%) —$NaNO_3$ (60%)), and a liquid metal (such as Pb). As the fluid, a mixed phase fluid in which solid particles are dispersed in a gas or a liquid may be used. Examples of the solid particles include a metal, a metal compound, an alloy, and ceramics. Examples of the metal include copper, nickel, titanium, and cobalt. Examples of the metal compound include an oxide, a nitride, and a silicide of the above-described metals. Examples of the alloy include stainless steel and chromium molybdenum steel. Examples of the ceramics include alumina. The type of fluid can be appropriately selected depending on the application of the heat generating device 10.

In the present embodiment, water is used as the fluid. The heat generating device 10 heats water flowing through the flow path 14 by the heat generating element 13 to generate high-temperature and high-pressure water (hereinafter referred to as high-temperature and high-pressure water).

The sealed container 11 is configured to accommodate the tubular body 12 and the heat generating element 13. The sealed container 11 has a hollow tubular shape. The sealed container 11 has a cylindrical shape in this example, but may have various shapes such as an elliptic cylindrical shape and a square tubular shape. The height of the sealed container 11 is set to 13 to 15 m, for example. The diameter of the sealed container 11 is 3.1 m, for example. The size of the sealed container 11 is not particularly limited, and can be appropriately designed.

The sealed container 11 is made of a material having heat resistance and pressure resistance. The material of the sealed container 11 can be appropriately selected in accordance with use conditions (for example, temperature and pressure). Examples of the material of the sealed container 11 include carbon steel, austenitic stainless steel, and heat-resistant non-ferrous alloy. Examples of the austenitic stainless steel include SUS304L, SUS316L, SUS310S, and the like which are standardized by JIS (Japanese Industrial Standards). For example, as the material of the sealed container 11, carbon steel is used when the use temperature is 350° C. or lower, SUS304L is used when the use temperature is higher than 350° C., SUS316L or SUS310S is used when the use temperature is 600 to 700° C., and a non-ferrous alloy suitable for heat resistance is used when the use temperature is higher than 700° C.

The sealed container 11 has a main body 17 formed in a tubular shape, a fluid inflow chamber 18 provided at one end of the main body 17, and a fluid outflow chamber 19 provided at the other end of the main body 17. In the sealed container 11, the side where the fluid inflow chamber 18 is provided with respect to the main body 17 is the lower side, and the side where the fluid outflow chamber 19 is provided with respect to the main body 17 is the upper side.

The main body 17 has a gas inlet 21 which is an inlet of the hydrogen-based gas and a gas outlet 22 which is an outlet of the hydrogen-based gas. The main body 17 has a cylindrical shape in this example, but may have various shapes such as an elliptic cylindrical shape and a square tubular shape. The fluid inflow chamber 18 has a fluid inlet 23 which is an inlet of the fluid. The fluid outflow chamber 19 has a fluid outlet 24 which is an outlet of the fluid.

The hydrogen-based gas means a gas containing an isotope of hydrogen. As the hydrogen-based gas, at least one of a deuterium gas and a light hydrogen gas is used. The light hydrogen gas includes a mixture of naturally occurring light hydrogen and deuterium, i.e., a mixture in which the abundance ratio of light hydrogen is 99.985% and the abundance ratio of deuterium is 0.015%. In the following description, when light hydrogen and deuterium are not distinguished from each other, they are referred to as "hydrogen".

Inside the sealed container 11, a hollow portion 26 in which the tubular body 12 and the heat generating element 13 are arranged is provided. The hollow portion 26 is formed by an inner surface of the sealed container 11. To be specific, the hollow portion 26 is a tubular space defined by an inner surface of the main body 17 and an outer surface of the heat generating element 13 to be described later.

The hollow portion 26 is connected to a gas supply unit 27 via the gas inlet 21. Although not shown, the gas supply unit 27 is constituted by a gas cylinder that stores the hydrogen-based gas, a pipe that connects the gas cylinder and the hollow portion 26, a valve for adjusting the flow rate of the hydrogen-based gas and the pressure in the pipe, and the like, and supplies the hydrogen-based gas to the hollow portion 26.

The hollow portion 26 is connected to a gas exhaust unit 28 via the gas outlet 22. Although not shown, the gas exhaust unit 28 is constituted by a vacuum pump, a pipe connecting the vacuum pump and the hollow portion 26, a valve for adjusting the flow rate of the hydrogen-based gas and the pressure in the pipe, and the like, and performs vacuum evacuation of the hollow portion 26.

The tubular body 12 is provided in the hollow portion 26 of the sealed container 11. The tubular body 12 is a hollow pipe. The inside of the tubular body 12 is controlled to a predetermined pressure by the control unit 16 to be described later. In the present embodiment, the pressure is controlled so that water does not become water vapor at about 300° C. and is kept in a liquid state. The pressure inside the tubular body 12 is 100 bar in the present embodiment, but is not limited to this and can be appropriately designed.

The tubular body 12 is made of a material having heat resistance and pressure resistance. A material of the tubular body 12 can be appropriately selected in accordance with use conditions (for example, temperatures and pressures). As the material of the tubular body 12, the same material as the sealed container 11, that is, carbon steel, austenitic stainless steel, heat-resistant non-ferrous alloy steel, or the like is used.

The shape of the tubular body 12 can be various shapes such as a cylindrical shape, an elliptic cylindrical shape, and a square tubular shape. Various dimensions of the tubular body 12 are not particularly limited, and can be appropriately designed. For example, the tubular body 12 may have a cylindrical shape having a length of 10 m, a thickness (wall thickness) of 0.005 to 0.010 m, and a diameter of 0.05 m. It is preferable that the thickness is appropriately designed based on the temperature and pressure of the fluid flowing through the inside of the tubular body 12 (the flow path 14 to be described later). The tubular body 12 can be formed in a desired length by, for example, connecting a plurality of pipe members in series. The number of the tubular body 12 is not particularly limited, and may be one or more. For example, 800 pieces of tubular body 12 can be installed in the sealed container 11. In the present embodiment, a plurality of tubular bodies 12 are provided in the hollow portion 26. That is, the heat generating device 10 includes a plurality of tubular bodies 12 provided in the hollow portion 26. In FIG. 1, only one tubular body 12 of the plurality of tubular bodies 12 is shown and the other tubular bodies 12 are omitted for simplification of the drawing.

The heat generating element 13 is provided on an outer surface of the tubular body 12. Therefore, the heat generating element 13 has a tubular shape. In the present embodiment, one heat generating element 13 is provided for each of the plurality of tubular bodies 12. That is, the heat generating device 10 includes a plurality of heat generating elements 13.

The heat generating element 13 is arranged in the hollow portion 26 and is in contact with the hydrogen-based gas supplied to the hollow portion 26. The thickness (wall thickness) of the heat generating element 13 is not particularly limited, and can be appropriately designed so as to obtain a desired output as the heat generating device 10. For example, the thickness is set to 0.005 to 0.010 m. In the heat generating element 13, one heat generating element 13 is provided on the entire outer surface of one tubular body 12. It should be noted that a plurality of heat generating elements 13 may be provided on the outer surface of one tubular body 12 at intervals from each other.

The heat generating element 13 generates heat by occlusion and discharge of hydrogen contained in the hydrogen-based gas. When the hydrogen-based gas is supplied to the hollow portion 26, the heat generating element 13 occludes hydrogen contained in the hydrogen-based gas. When the heat generating element 13 is heated in a state in which the hollow portion 26 is evacuated, the heat generating element 13 is heated to a temperature equal to or higher than the heating temperature and generates heat (hereinafter referred to as excess heat).

When the operation of the heat generating device 10 is started, the heat generating element 13 is heated by water (fluid) heated by a heating unit 33 to be described later, and generates excess heat by reaching a predetermined temperature. The present embodiment assumes a case where the heat generating element 13 is heated to, for example, 270 to 300° C. to generate excess heat. The temperature of the heat generating element 13 in a state of generating excess heat is set to fall within a range of, for example, 300° C. or higher and 1500° C. or lower.

The flow path 14 is provided inside the tubular body 12. The flow path 14 is formed by an inner surface of the tubular body 12. The flow path 14 circulates a fluid that performs heat exchange with the heat generating element 13. The flow path 14 is not connected to the hollow portion 26. Therefore, the fluid and the hydrogen-based gas are prevented from flowing between the flow path 14 and the hollow portion 26.

When the heated fluid flows into the flow path 14, the heat generating element 13 is heated via the tubular body 12. Accordingly, the heat generating element 13 generates excess heat, and the fluid flowing through the flow path 14 is heated via the tubular body 12. As a result, a high-temperature and high-pressure fluid is generated in the flow path 14, and the high-temperature and high-pressure fluid flows out from the flow path 14. In the case of the present embodiment, the water flowing into the flow path 14 is heated by the heat generating element 13 generating excess heat, and flows out from the flow path 14 as high-temperature and high-pressure water at, for example, 300° C. A part of the water in the flow path 14 may become water vapor.

The fluid circulation unit 15 includes a circulation line 30 that is connected to the flow path 14 and circulates the fluid between the inside and the outside of the tubular body 12. The circulation line 30 connects the fluid inlet 23 of the fluid inflow chamber 18 and the fluid outlet 24 of the fluid outflow chamber 19 outside the sealed container 11.

The circulation line 30 is provided with a cooling unit 32 for cooling the fluid and a heating unit 33 for heating the fluid. That is, the heat generating device 10 further includes the cooling unit 32 and the heating unit 33.

In the present embodiment, in addition to the cooling unit 32 and the heating unit 33, a reservoir tank 36 that stores water and a pump 40 that circulates water are provided in the circulation line 30. Further, a pressure indicator PI, a temperature indicator TI, and a flow rate indicator FI are provided in each portion of the circulation line 30. The number of the pressure indicator PI, the temperature indicator TI, and the flow rate indicator FI is not particularly limited, but is preferably one or more. In each portion of the circulation line 30 between the fluid outlet 24 and the fluid inlet 23 of the sealed container 11, the pressure indicator PI, the temperature indicator TI, the cooling unit 32, the temperature indicator TI, the reservoir tank 36, the pump 40, the temperature indicator TI, the heating unit 33, the temperature indicator TI, and the flow rate indicator FI are provided in this order. The reservoir tank 36 is provided with a temperature indicator TI.

The cooling unit 32 is electrically connected to the control unit 16, and the driving thereof is controlled by the control unit 16. The cooling unit 32 cools high-temperature and high-pressure water as a fluid flowing out from the flow path 14. In the cooling unit 32, for example, high-temperature and high-pressure water at 300° C. is cooled to 270° C.

The cooling unit 32 has a function as a boiler in this example. The cooling unit 32 as a boiler performs heat exchange between the high-temperature and high-pressure water and boiler water as a heat medium, and generates high-temperature and high-pressure steam (hereinafter referred to as superheated steam) from the boiler water. The superheated steam is supplied to a steam turbine, and power can be generated by a generator connected to the steam turbine.

The heating unit 33 is electrically connected to the control unit 16, and the driving thereof is controlled by the control unit 16. The heating unit 33 heats water as a fluid to be caused to flow into the flow path 14.

The heating unit 33 is, for example, an electric furnace that generates heat by electric supply. The heating unit 33 may be a fuel furnace that generates heat by burning fuel. When the operation of the heat generating device 10 is started, water is heated to, for example, 270° C. in the heating unit 33. When the fluid heated by the heating unit 33 flows into the flow path 14, the temperature of the heat generating element 13 is increased to a predetermined temperature to generate excess heat. That is, the heating unit 33 functions as a start-up heater that raises the temperature of the heat generating element 13 to a predetermined temperature at the start of operation of the heat generating device 10.

The heating unit 33 is directly provided in the circulation line 30 in the present embodiment, but may be provided in a branch line branched from the circulation line 30. When the heating unit 33 is provided in the branch line, a part or all of the fluid flowing through the circulation line 30 is caused to flow into the branch line, and the fluid heated by the heating unit 33 is returned to the circulation line 30. This allows the heated fluid to flow into the flow path 14. By connecting the circulation line 30 and the branch line via a valve, the flow rate of water flowing into the branch line can be controlled.

During operation of the heat generating device 10, driving of the cooling unit 32 and the heating unit 33 is controlled such that the temperature of the fluid flowing into the flow path 14 is maintained within a predetermined range. For example, if the heat generating element 13 generates excess heat, the temperature of the water flowing into the flow path 14 is maintained at about 270° C. As a result, the temperature of the heat generating element 13 is made substantially constant, and the temperature and flow rate of the high-temperature and high-pressure water flowing out from the flow path 14 are stabilized.

The control unit 16 is electrically connected to each unit of the heat generating device 10 and controls the operation of each unit. The control unit 16 includes, for example, an arithmetic device (Central Processing Unit), a storage unit such as a read-only memory (Read Only Memory) or a random access memory (Random Access Memory). The arithmetic device executes various kinds of arithmetic processing using, for example, a program and data stored in the storage unit.

The control unit 16 performs temperature decrease control for decreasing the temperature of the heat generating element 13 by driving the cooling unit 32 and causing the fluid cooled by the cooling unit 32 to flow into the flow path 14, and temperature increase control for increasing the temperature of the heat generating element 13 by driving the heating unit 33 and causing the fluid heated by the heating unit 33 to flow into the flow path 14. The control unit 16 adjusts the temperature of the fluid flowing into the flow path 14 by switching between the temperature decrease control and the temperature increase control based on the temperature of the fluid flowing through the circulation line 30.

The control unit 16 controls temperatures, pressures, flow rates, and the like of each unit of the heat generating device 10 based on detection results of the temperature indicator TI, detection results of the pressure indicator PI, detection results of the flow rate indicator FI, and the like. For example, when the heat generating element 13 generates excess heat at 270 to 300° C., the control unit 16 sets the temperature of the fluid flowing into the flow path 14 to 270° C. and the pressure of the fluid to 100 bar. The enthalpy of the fluid flowing into the flow path 14 is 283 kcal/kg, which is $28.3\times10^{8}$ kcal/h. The water flowing into the flow path 14 is heated to 300° C. by the heat generating element 13, and flows out from the flow path 14 as high-temperature and high-pressure water. Since the saturation temperature of water when the pressure is 100 bar is 311° C., the water flowing into the flow path 14 does not turn into water vapor even if the temperature is raised to 300° C.

Figure 2:
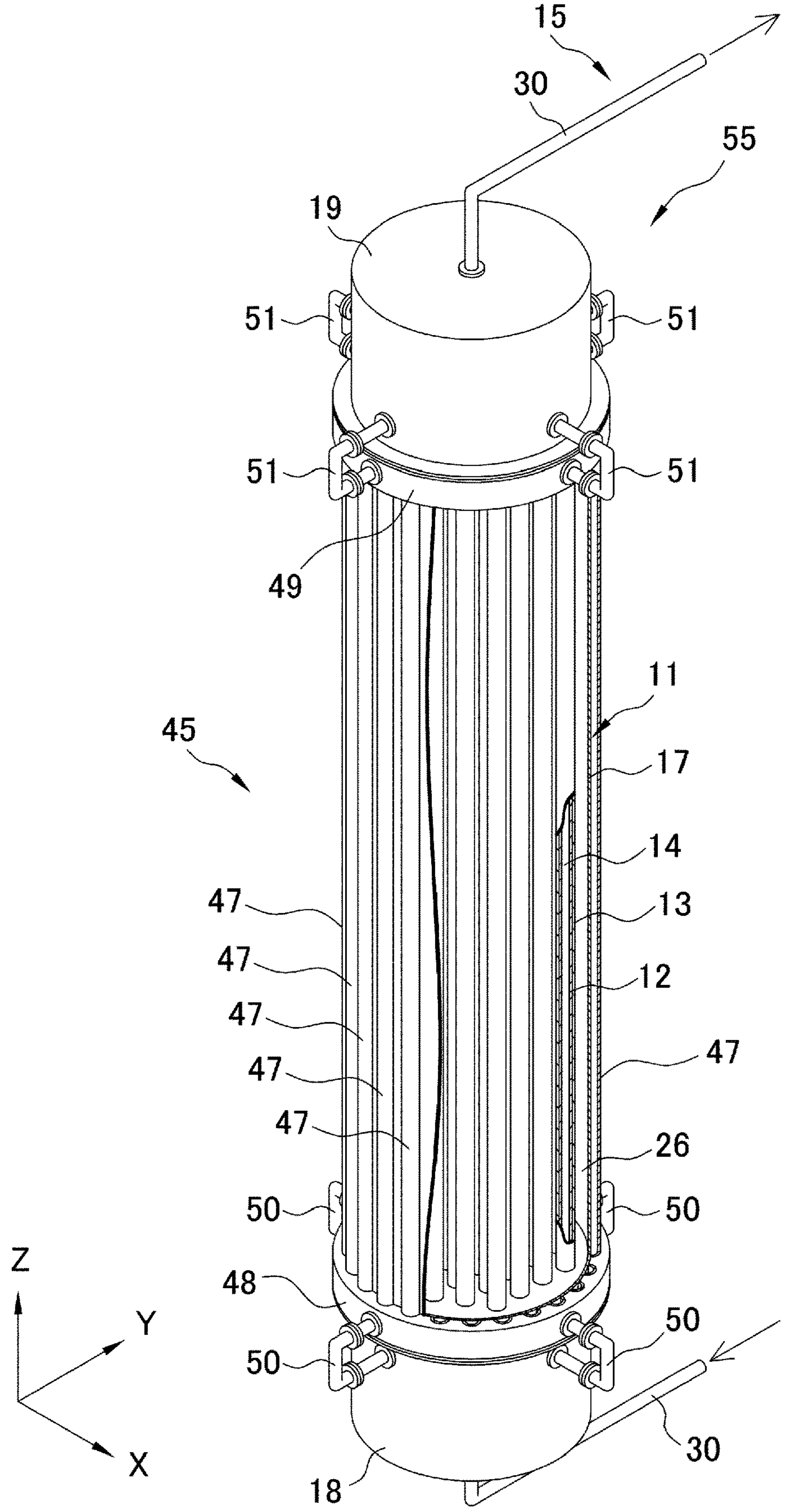
FIG. 2 is a cutaway perspective view showing a part of a sealed container.

FIG. 2 is a cutaway perspective view showing a part of the sealed container 11. In FIG. 2, a part of one tubular body 12 and one heat generating element 13 among the plurality of tubular bodies 12 and heat generating elements 13 is cut off to illustrate the inside thereof.

As shown in FIG. 2, the fluid circulation unit 15 further includes an external fluid line 45 in addition to the circulation line 30. Each tubular body 12 provided in the hollow portion 26 of the sealed container 11 is heated by heat of the fluid flowing through the flow path 14 provided inside or heat of the heat generating element 13 provided on the outer surface, and the temperature rises to thermally expand. On the other hand, since the main body 17 of the sealed container 11 is not in contact with the tubular body 12 and the heat generating element 13 and the temperature rise thereof is suppressed more than that of the tubular body 12, the main body 17 is less thermally expanded than the tubular body 12. Therefore, thermal stress is generated in the plurality of tubular bodies 12 and the main body 17 of the sealed container 11. The external fluid line 45 is intended to prevent damage due to this thermal stress.

The external fluid line 45 is provided on the outer surface of the sealed container 11 and is connected to the circulation line 30 to allow a part of the fluid to flow therethrough. The external fluid line 45 includes a plurality of first pipes 47 provided on the outer surface of the sealed container 11, a first ring pipe 48 connecting one ends of the plurality of first pipes 47, a second ring pipe 49 connecting the other ends of the plurality of first pipes 47, a plurality of second pipes 50 connecting the first ring pipe 48 and the fluid inflow chamber 18, and a plurality of third pipes 51 connecting the second ring pipe 49 and the fluid outflow chamber 19.

Each of the plurality of first pipes 47 extends in the vertical direction (Z direction in the drawing) of the sealed container 11. The first ring pipe 48 is provided on a flange at one end of the main body 17 of the sealed container 11. The second ring pipe 49 is provided on the flange at the other end of the main body 17 of the sealed container 11. The first ring pipe 48 and the second ring pipe 49 are formed by forming a pipe material into a ring shape along the outer periphery of the main body 17, and are configured to allow a fluid to flow inside. The plurality of second pipes 50 guide the fluid in the fluid inflow chamber 18 to the first ring pipe 48. The fluid in the first ring pipe 48 passes through the plurality of first pipes 47 and moves to the second ring pipe 49. The plurality of third pipes 51 guide the fluid in the second ring pipe 49 to the fluid outflow chamber 19. The numbers of the first pipe 47, the second pipe 50, and the third pipe 51 are not particularly limited, and can be appropriately changed.

Figure 3:
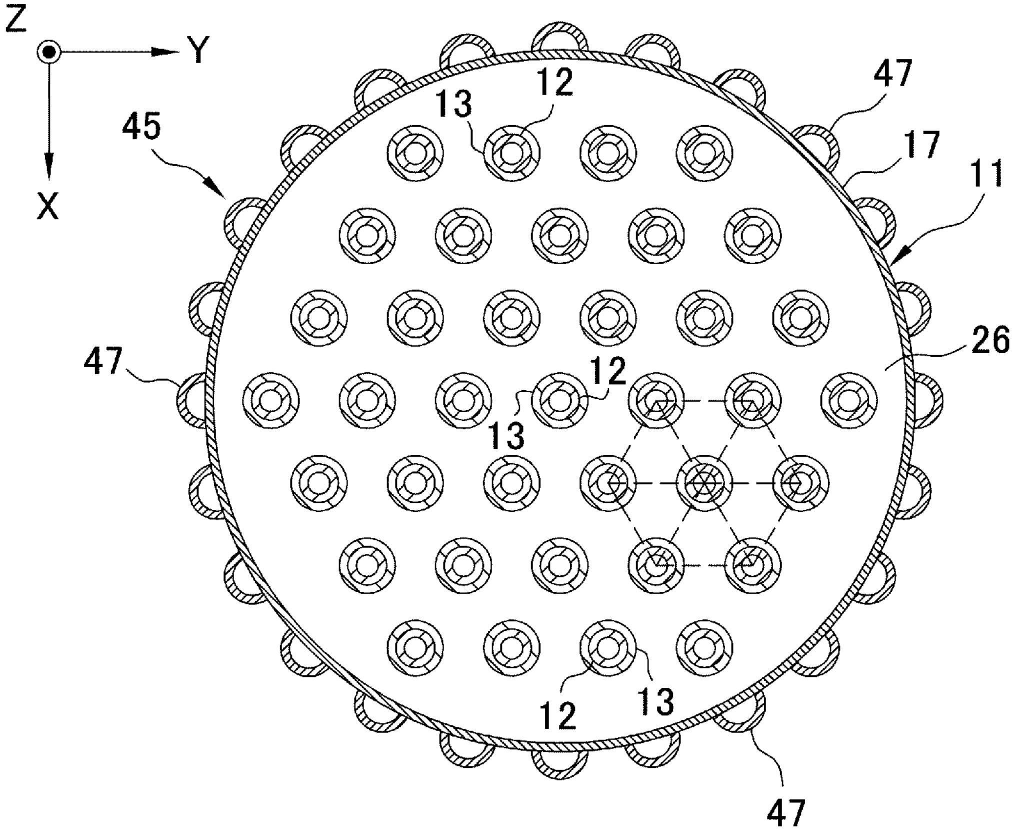
FIG. 3 is a cross-sectional view of the sealed container.

As shown in FIG. 3, the plurality of first pipes 47 are arranged at equal intervals in the circumferential direction of the sealed container 11. The cross-sectional shape of each first pipe 47 is a semicircular shape in the present embodiment, but is not limited thereto, and may be a rectangular shape, a semi-elliptical shape, or the like. FIG. 3 is a cross-sectional view taken along the XY plane in the main body 17 of the sealed container 11.

In the hollow portion 26, the plurality of tubular bodies 12 are arranged in a staggered manner at equal intervals from each other. That is, in three tubular bodies 12 adjacent to each other, a shape obtained by connecting the centers of each tubular body 12 forms an equilateral triangle (indicated by a dotted line in FIG. 3). The distance between the centers of the tubular bodies 12 adjacent to each other is set at 0.15 m.

Figure 4:
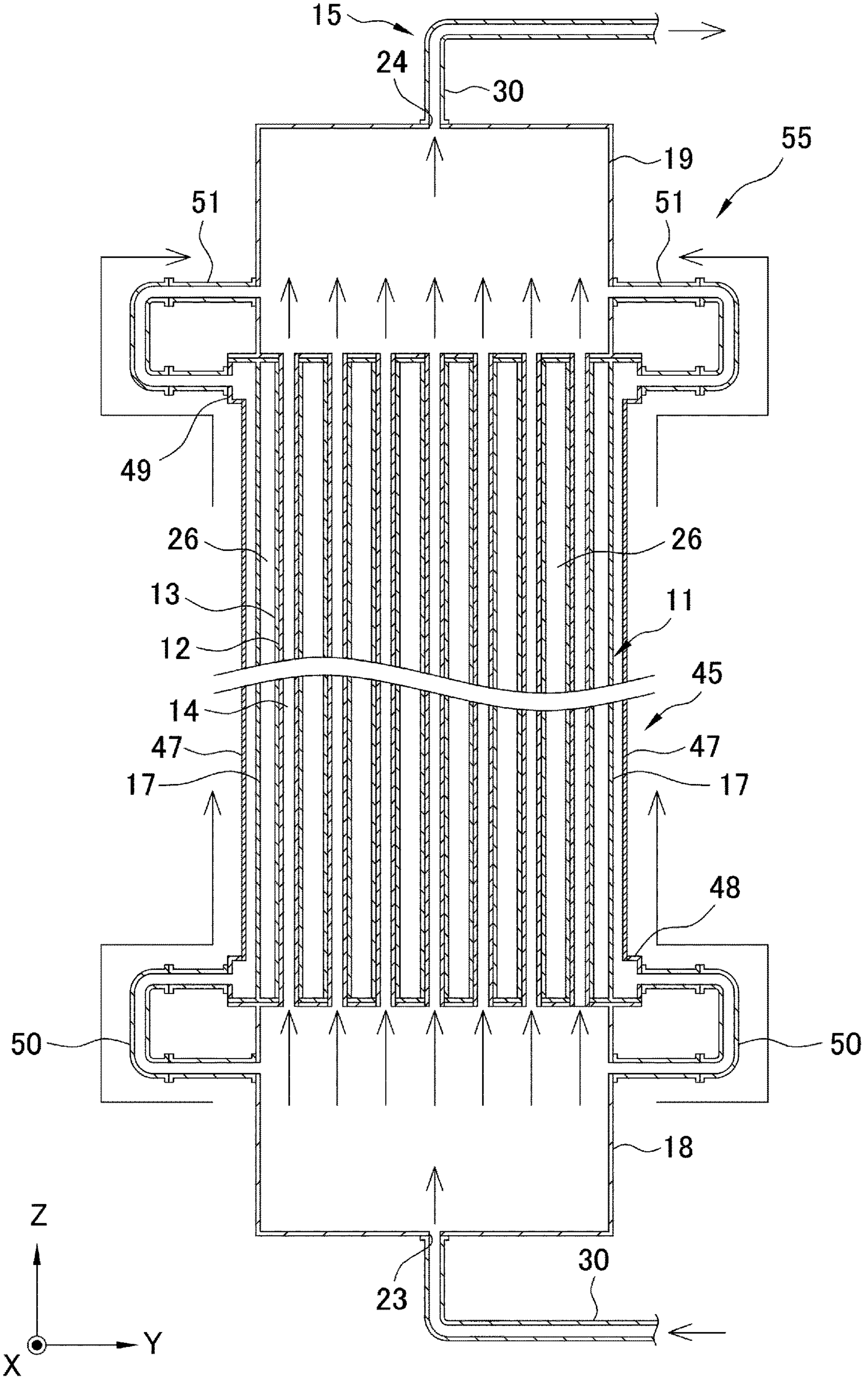
FIG. 4 is an explanatory diagram showing a flow of a fluid in the sealed container.

The flow of the fluid in the sealed container 11 will be described with reference to FIG. 4. The fluid flowing through the circulation line 30 flows into the fluid inflow chamber 18 from the fluid inlet 23. A part of the fluid in the fluid inflow chamber 18 flows from one end of the plurality of tubular bodies 12 to the flow path 14. In the flow path 14, the fluid is heated by the heat generating element 13. The fluid heated in the flow path 14 flows from the other end of the plurality of tubular bodies 12 to the fluid outflow chamber 19, and flows out from the fluid outlet 24 to the circulation line 30.

The remaining part of the fluid in the fluid inflow chamber 18 flows into the plurality of second pipes 50. The fluid in the plurality of second pipes 50 is guided to the plurality of first pipes 47 via the first ring pipe 48. In the plurality of first pipes 47, the fluid is heated by radiant heat of the heat generating element 13. The fluid heated in the plurality of first pipes 47 is guided to the fluid outflow chamber 19 via the second ring pipe 49 and the plurality of third pipes 51 in this order, and merges with the fluid heated in the flow path 14.

A heat generating module 55 is configured by the external fluid line 45, the sealed container 11, the tubular body 12, the heat generating element 13, and the flow path 14 as described above. Although the heat generating device 10 of the present embodiment includes one heat generating module 55, the number of the heat generating modules 55 is not particularly limited and may be two or more.

Figure 5:
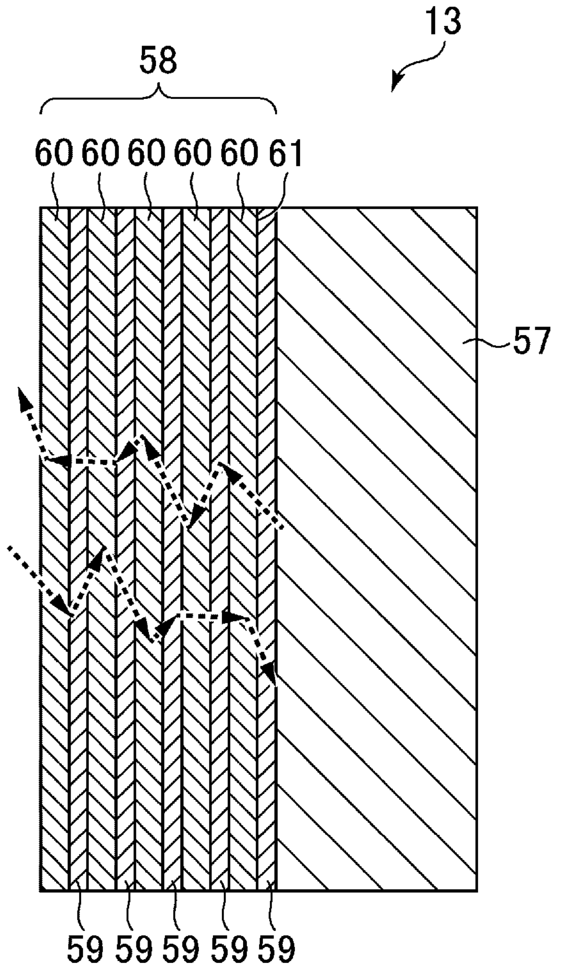
FIG. 5 is a cross-sectional view showing a structure of a heat generating element having a first layer and a second layer.

The heat generating element 13 will be described in detail with reference to FIG. 5. As shown in FIG. 5, the heat generating element 13 includes a base 57 and a multilayer film 58.

The base 57 is provided on an outer surface of the tubular body 12. The tubular body 12 is not shown in FIG. 5. The base 57 is made of a hydrogen storage metal, a hydrogen storage alloy, or a proton conductor. Examples of the hydrogen storage metal include Ni, Pd, V, Nb, Ta, and Ti. Examples of the hydrogen storage alloy include $LaNi_5$, $CaCu_5$, $MgZn_2$, $ZrNi_2$, $ZrCr_2$, TiFe, TiCo, $Mg_2Ni$, and $Mg_2Cu$. Examples of the proton conductor include a $BaCeO_3$-based conductor (for example, $Ba(Ce_{0.95}Y_{0.05})O_{3-6}$), a $SrCeO_3$-based conductor (for example, $Sr(Ce_{0.95}Y_{0.05})O_{3-6}$), a $CaZrO_3$-based conductor (for example, $CaZr_{0.95}Y_{0.05}O_{3-\alpha}$), a $SrZrO_3$-based conductor (for example, $SrZr_{0.9}Y_{0.1}O_{3-\alpha}$), $\beta$ $Al_2O_3$, and $\beta$ $Ga_2O_3$.

The multilayer film 58 is provided on a surface of the base 57. The multilayer film 58 is formed by a first layer 59 made of a hydrogen storage metal or a hydrogen storage alloy and a second layer 60 made of a hydrogen storage metal or a hydrogen storage alloy, which is different from that of the first layer 59, or ceramics. A heterogeneous material interface 61 is formed between the base 57 and the first layer 59 and the second layer 60.

The first layer 59 is made of, for example, any one of Ni, Pd, Cu, Mn, Cr, Fe, Mg, Co, and an alloy thereof. The alloy for forming the first layer 59 is preferably an alloy composed of two or more of Ni, Pd, Cu, Mn, Cr, Fe, Mg, and Co. As the alloy for forming the first layer 59, an alloy obtained by adding an additive element to Ni, Pd, Cu, Mn, Cr, Fe, Mg, or Co may be used.

The second layer 60 is made of, for example, any one of Ni, Pd, Cu, Mn, Cr, Fe, Mg, Co, an alloy thereof, and SiC. The alloy for forming the second layer 60 is preferably an alloy composed of two or more of Ni, Pd, Cu, Mn, Cr, Fe, Mg, and Co. As the alloy for forming the second layer 60, an alloy obtained by adding an additive element to Ni, Pd, Cu, Mn, Cr, Fe, Mg, or Co may be used.

As a combination of the first layer 59 and the second layer 60, it is preferably Pd—Ni, Ni—Cu, Ni—Cr, Ni—Fe, Ni—Mg, or Ni—Co when types of elements are expressed as "first layer 59-second layer 60 (second layer 60-first layer 59)". When the second layer 60 is made of ceramics, the "first layer 59-the second layer 60" is preferably made of Ni—SiC.

The thickness of the first layer 59 and the thickness of the second layer 60 are each preferably less than 1000 nm. When the thickness of each of the first layer 59 and the second layer 60 is 1000 nm or more, it becomes difficult for hydrogen to permeate through the multilayer film 58. In addition, since the thickness of each of the first layer 59 and the second layer 60 is less than 1000 nm, it is possible to maintain a nanostructure that does not exhibit bulk characteristics. The thickness of each of the first layer 59 and the second layer 60 is more preferably less than 500 nm. Since the thickness of each of the first layer 59 and the second layer 60 is less than 500 nm, it is possible to maintain a nanostructure that does not completely exhibit bulk characteristics.

In FIG. 5, the multilayer film 58 has a configuration in which the first layer 59 and the second layer 60 are alternately stacked in this order on the surface of the base 57. Each of the first layer 59 and the second layer 60 includes five layers. The number of layers of the first layer 59 and the second layer 60 may be appropriately changed. The multilayer film 58 may have a configuration in which the second layer 60 and the first layer 59 are alternately stacked in this order on the surface of the base 57. It is sufficient that the multilayer film 58 has one or more first layers 59 and one or more second layers 60, and one or more heterogeneous material interfaces 61 are formed.

Figure 6:
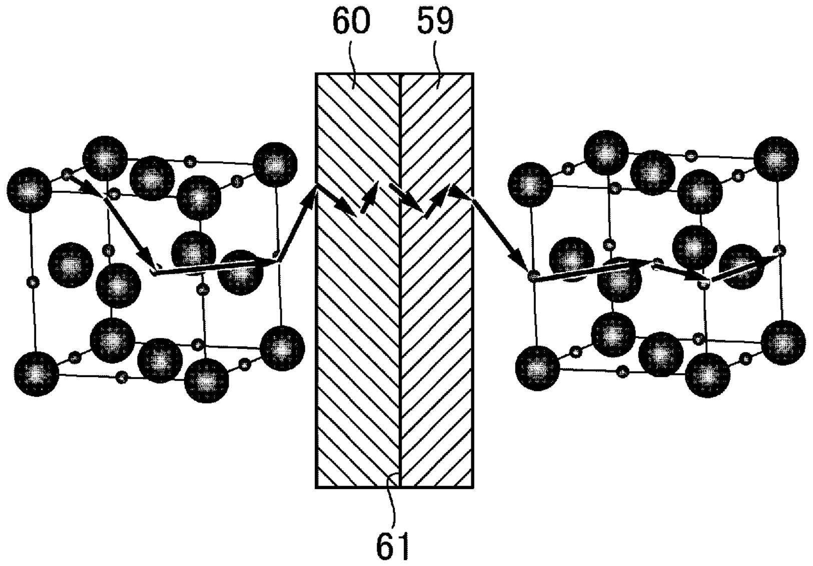
FIG. 6 is an explanatory diagram showing generation of excess heat.

As shown in FIG. 6, the heterogeneous material interface 61 is permeable to hydrogen atoms. FIG. 6 is a schematic diagram showing a state in which hydrogen atoms in a metal lattice of the first layer 59 permeate through the heterogeneous material interface 61 and move into a metal lattice of the second layer 60 when the first layer 59 and the second layer 60 each made of a hydrogen storage metal having a face-centered cubic structure are made to occlude hydrogen and then the first layer 59 and the second layer 60 are heated.

The heat generating element 13 occludes hydrogen by the base 57 and the multilayer film 58 when the hydrogen-based gas is supplied to the sealed container 11. Even when the supply of the hydrogen-based gas to the sealed container 11 is stopped, the heat generating element 13 maintains a state where hydrogen is occluded in the base 57 and the multilayer film 58. When the heating of the heat generating element 13 is started by the fluid, the hydrogens occluded in the base 57 and the multilayer film 58 are discharged and quantum diffusion occurs while hopping the inside of the multilayer film 58. It is known that hydrogen is light and undergoes quantum diffusion while hopping at a site (octahedral site or tetrahedral site) occupied by hydrogen of a certain substance A and substance B. When the heat generating element 13 is heated in a vacuum state, hydrogen permeates through the heterogeneous material interface 61 in a manner of quantum diffusion, and generates excess heat equal to or higher than the temperature of the fluid.

An example of a method for producing the heat generating element 13 will be described. The heat generating element 13 can be produced using, for example, a sputtering method. After the base 57 is formed on the outer surface of the cylindrical tubular body 12, the first layer 59 and the second layer 60 are alternately formed on the base 57 to obtain the heat generating element 13. The base 57 is preferably formed to be thicker than the first layer 59 and the second layer 60, and Ni is used as the material of the base 57, for example. It is preferable that the first layer 59 and the second layer 60 are formed continuously in a vacuum state. As a result, no natural oxide film is formed between the first layer 59 and the second layer 60, and only the heterogeneous material interface 61 is formed. The production method of the heat generating element 13 is not limited to the sputtering method, and a vapor deposition method, a wet method, a thermal spraying method, an electroplating method, or the like can be used.

A heat generating method using the heat generating device 10 includes a hydrogen occluding step of occluding the hydrogen contained in the hydrogen-based gas into the heat generating element 13 by supplying the hydrogen-based gas to the hollow portion 26 of the sealed container 11, and a hydrogen discharging step of discharging the hydrogen occluded in the heat generating element 13 by performing the vacuum evacuation of the hollow portion 26 of the sealed container 11 and the heating of the heat generating element 13. The hydrogen occluding step and the hydrogen discharging step may be repeatedly performed.

As described above, the heat generating device 10 generates a high-temperature fluid (high-temperature and high-pressure water) by performing heat exchange between the heat generating element 13 provided on the outer surface of the tubular body 12 and the fluid (water) flowing through the flow path 14 formed by the inner surface of the tubular body 12. The high-temperature and high-pressure water as a high-temperature fluid can be used to generate superheated steam in the boiler (cooling unit 32). The superheated steam generated in the boiler can be used in a steam turbine. Since the heat generating element 13 generates heat using hydrogen, it does not generate greenhouse gases such as carbon dioxide. Further, since hydrogen used to generate heat in the heat generating element 13 can be generated from water, it is inexpensive. Further, the heat generation of the heat generating element 13 is considered safe because there is no chain reaction unlike a nuclear fission reaction. Therefore, since the heat generating device 10 uses the heat generating element 13 as an energy source, energy can be supplied inexpensively, cleanly and safely.

In the heat generating device 10, since the external fluid line 45 is provided on the outer surface of the main body 17 of the sealed container 11, even when the main body 17 is heated by radiant heat of the heat generating element 13, heat of the main body 17 is transmitted to the fluid flowing through the external fluid line 45, so that the thermal expansion of the main body 17 is suppressed. Further, in the heat generating device 10, since the flow path 14 is provided inside the tubular body 12, even when the tubular body 12 is heated by the heat generating element 13, heat of the tubular body 12 is transmitted to the fluid flowing through the flow path 14, so that the thermal expansion of the tubular body 12 is suppressed. In the heat generating device 10, even when the tubular body 12 and the main body 17 are thermally expanded, since the elongation of the tubular body 12 and the elongation of the main body 17 are the same degree, so that damage due to thermal stress is prevented.

In the heat generating device 10, the temperature of the fluid circulating in the circulation line 30 is maintained constant by switching between the temperature decrease control and the temperature increase control by the control unit 16, and the heat generation of the heat generating element 13 is stabilized.

Second Embodiment

In the first embodiment, the water flowing into the flow path 14 is heated by the heat generating element 13 to generate high-temperature and high-pressure water, but in the second embodiment, the water flowing into the flow path 14 is heated by the heat generating element 13 to generate superheated steam, and the superheated steam is used as a working fluid for steam turbines to generate electric power. The same members as those in the first embodiment are denoted by the same reference numerals, and description thereof will be omitted.

Figure 7:
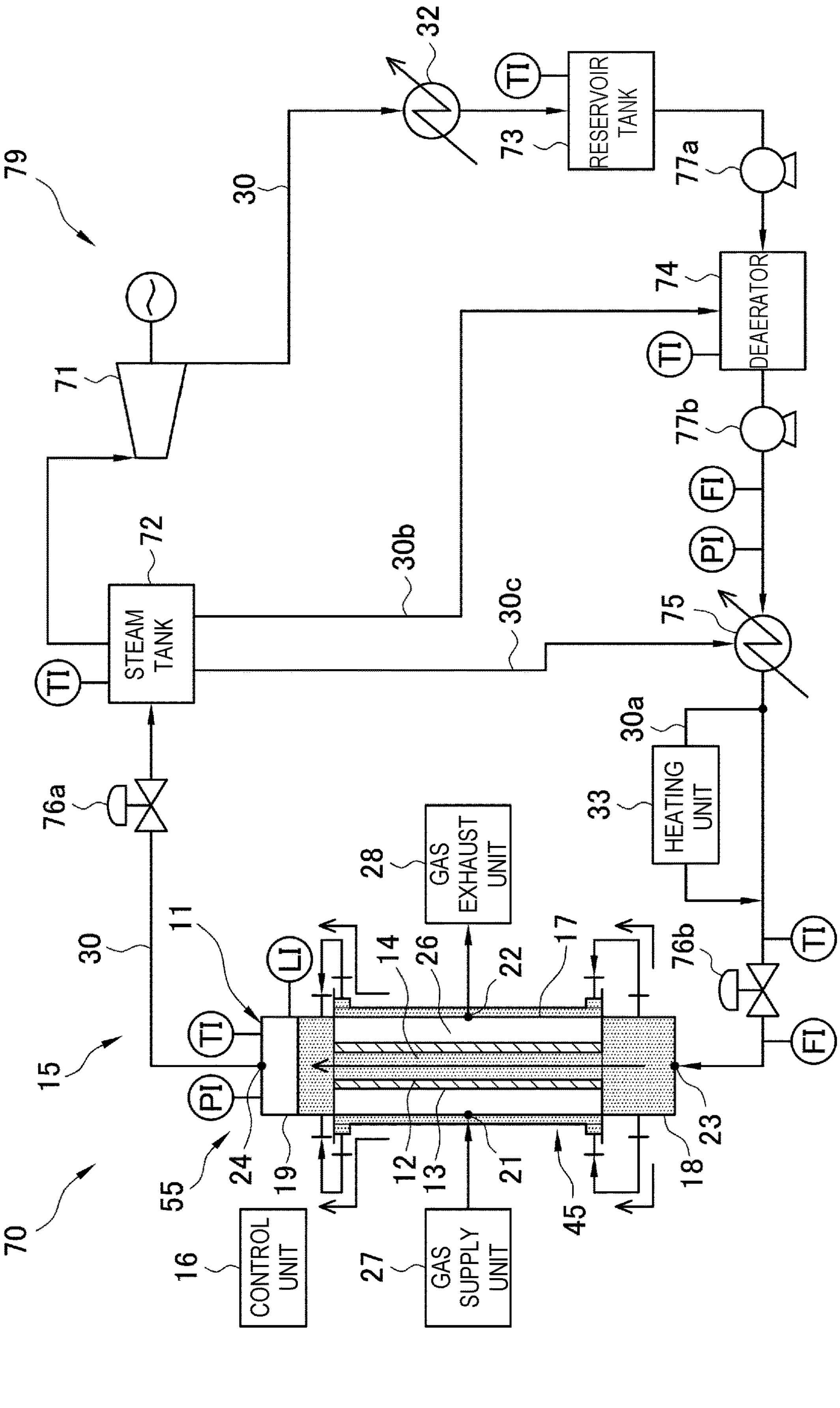
FIG. 7 is a schematic diagram showing a heat generating device according to a second embodiment.

As shown in FIG. 7, a heat generating device 70 includes one heat generating module 55, similarly to the heat generating device 10 of the first embodiment. The heat generating device 70 is configured such that a liquid (water) as a fluid flows into the flow path 14 and gas (water vapor) as a fluid flows out from the flow path 14. To be specific, when the operation of the heat generating device 70 is started, water as a fluid is heated by the heating unit 33. When the water heated by the heating unit 33 flows into the flow path 14, the heat generating element 13 is heated via the tubular body 12. Thus, the heat generating element 13 generates excess heat. When the heat generating element 13 generates excess heat, water flowing through the flow path 14 is heated via the tubular body 12. As a result, superheated steam is generated in the flow path 14, and the superheated steam flows out from the flow path 14. In some cases, the water in the flow path 14 does not entirely turn into water vapor, and a part thereof flows out from the flow path 14 as water. FIG. 7 shows a state in which water and water vapor have flowed out from the flow path 14, the water has accumulated in the lower portion of the fluid outflow chamber 19, and the water vapor has moved to the upper portion of the fluid outflow chamber 19. The fluid outflow chamber 19 is provided with the pressure indicator PI, the temperature indicator TI, and a level gauge LI for detecting the height of the liquid surface in the fluid outflow chamber 19.

In the present embodiment, an internal pressure of the tubular body 12 is controlled to 90 bar. When the heat generating element 13 generates excess heat at 270 to 300° C., the control unit 16 sets the temperature of the fluid flowing into the flow path 14 to 270° C. and the pressure of the fluid to 90 bar. The water flowing into the flow path 14 is heated by the heat generating element 13 and flows out from the flow path 14 as superheated steam at, for example, 304° C.

In the second embodiment, the cooling unit 32, the heating unit 33, and a steam turbine 71 are provided in the circulation line 30. The cooling unit 32 cools and condenses the water vapor discharged from the steam turbine 71. As the cooling temperature in the cooling unit 32 is lower, the back pressure of the steam turbine 71 is lowered, and the power generation efficiency of a power generator connected to the steam turbine 71 is improved. The back pressure of the steam turbine 71 is controlled to, for example, 0.05 bar, and is determined based on the cooling method of the cooling unit 32 and the heat medium. The heating unit 33 is provided on a branch line 30*a* branched from the circulation line 30. The branch line 30*a* is connected to the circulation line 30 via a valve (not shown). When the operation of the heat generating device 70 is started, a part or all of the water flowing through the circulation line 30 flows into the branch line 30*a*, is heated by the heating unit 33, and is returned to the circulation line 30. As a result, water heated to, for example, 270° C. by the heating unit 33 flows into the flow path 14, and the heat generating element 13 generates excess heat.

The steam turbine 71 is a fluid utilization device that uses the superheated steam flowing out from the flow path 14 as a working fluid. The steam turbine 71 has a rotary shaft connected to the power generator, and rotate about the rotary shaft by being supplied with superheated steam. The power generator generates power by rotation of the steam turbine 71.

In addition to the cooling unit 32, the heating unit 33, and the steam turbine 71, a steam tank 72, a reservoir tank 73, a deaerator 74, a preheater 75, control valves 76*a* and 76*b*, and pumps 77*a* and 77*b* are provided on the circulation line 30 of the heat generating device 70. In FIG. 7, in the circulation line 30, in order from the fluid outlet 24 of the sealed container 11, control valve 76*a*, steam tank 72, steam turbine 71, cooling unit 32, reservoir tank 73, pump 77*a*, deaerator 74, pump 77*b*, preheater 75, heating unit 33, and control valve 76*b* are provided. The deaerator 74, the preheater 75, the control valves 76*a* and 76*b*, and the pumps 77*a* and 77*b* are electrically connected to the control unit 16.

The steam tank 72 is for temporarily storing the water vapor generated in the flow path 14. The steam tank 72 is connected to the deaerator 74 via a deaerating pipe 30*b* and is connected to the preheater 75 via a preheating pipe 30*c*.

The reservoir tank 73 is for storing water condensed by the cooling unit 32. The reservoir tank 73 is provided with the temperature indicator TI. The reservoir tank 73 is connected to a water supply source (not shown), and is configured to be supplied with water from this supply source.

The deaerator 74 degasses oxygen contained in the water flowing into the flow path 14 by using the water vapor supplied from the steam tank 72 via the deaerating pipe 30*b*. By degassing the water, corrosion of the boiler is prevented. The water degassed by the deaerator 74 is guided to the preheater 75.

The preheater 75 preheats the water flowing into the flow path 14 by using the water vapor supplied from the steam tank 72 via the preheating pipe 30*c*. In the preheater 75, water is preheated to, for example, 270° C. The water preheated by the preheater 75 flows into the flow path 14.

The control valve 76*a* adjusts the flow rate and pressure of the water vapor flowing out from the flow path 14. The control valve 76*b* adjusts the flow rate and pressure of the water flowing into the flow path 14. The pump 77*a* is for sending the water in the reservoir tank 73 to the deaerator 74. The pump 77*b* is for sending the water in the deaerator 74 to the preheater 75.

As described above, the heat generating device 70 generates a high-temperature fluid (superheated steam) by performing heat exchange between the heat generating element 13 provided on the outer surface of the tubular body 12 and the fluid (water) flowing through the flow path 14 formed by the inner surface of the tubular body 12. Superheated steam as a high-temperature fluid can be used for the steam turbine 71. The heat generating device 70 and the steam turbine 71 as a fluid utilization device constitute a heat utilization system 79. Therefore, since the heat generating device 70 and the heat utilization system 79 use the heat generating element 13 as an energy source, energy can be supplied inexpensively, cleanly, and safely.

When the fluid flowing out from the flow path 14 is water vapor (superheated steam) as in the present embodiment, the steam turbine 71 is suitable as the fluid utilization device. By using the steam turbine 71 as the fluid utilization device, heat energy obtained in the heat generating device 70 can be recovered as electrical energy. When the fluid flowing out from the flowpath 14 is a gas other than water vapor (for example, air, chlorofluorocarbon gas, helium gas, or the like), a gas turbine can be applied as the fluid utilization device. It is also possible to supply the fluid flowing out from the flow path 14 to a separately provided boiler, generate superheated steam in the boiler, and supply this superheated steam to the steam turbine to generate power. Further, as the fluid utilization device, a preheater that preheats combustion air can be applied in a combustion device that generates heat by burning fuel and combustion air. Examples of the combustion device include a boiler, a rotary kiln, a heat treatment furnace for metals, a heating furnace for metal processing, a hot-air furnace, a firing furnace for ceramics, a petroleum refining tower, a dry distillation furnace, and a drying furnace.

Third Embodiment

While the heat generating device 70 of the second embodiment includes one heat generating module 55, in the third embodiment, a plurality of heat generating modules 55 are connected. In this example, a case where three heat generating modules 55 are connected will be described, but the number of heat generating modules 55 is not particularly limited and can be increased or decreased so as to obtain a desired output. The same members as those in the above-described embodiments are denoted by the same reference numerals, and description thereof will be omitted.

Figure 8:
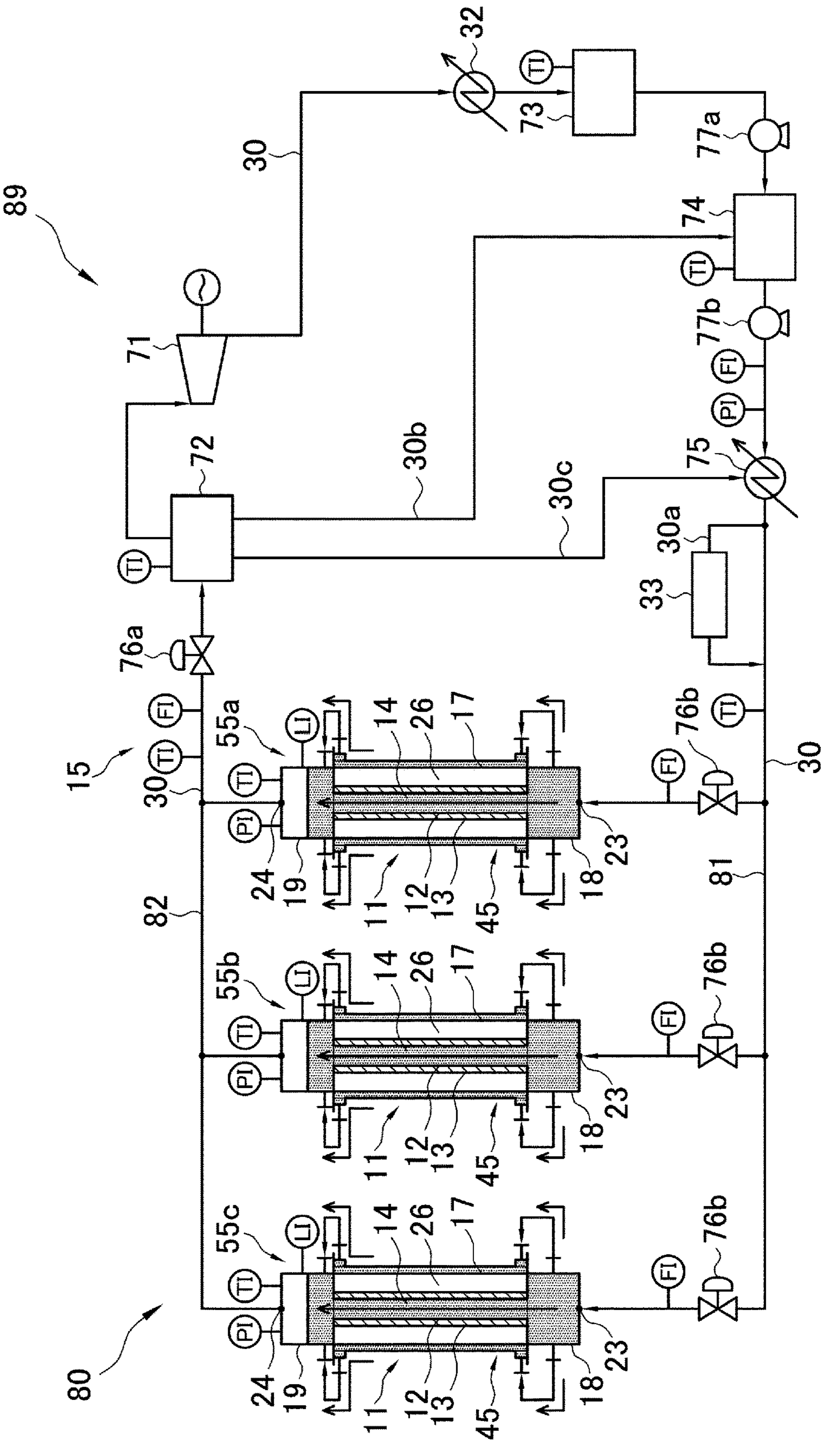
FIG. 8 is a schematic diagram showing a heat generating device according to a third embodiment.

As shown in FIG. 8, a heat generating device 80 includes three heat generating modules 55*a* to 55*c*. Since the configuration of each of the heat generating modules 55*a* to 55*c* is the same as the configuration of the heat generating module 55 of the first embodiment, the description thereof will be omitted. Although not shown in FIG. 8, the heat generating device 80 includes the control unit 16, and the operation of each unit is controlled by the control unit 16.

The gas supply unit 27 and the gas exhaust unit 28 are connected to the hollow portion 26.

The heat generating device 80 further includes a distribution pipe 81 and a collection pipe 82. The distribution pipe 81 is connected to the circulation line 30 and distributes the fluid to each of the heat generating modules 55*a* to 55*c*. The collection pipe 82 is connected to the circulation line 30, and collects the fluids flowing out from the heat generating modules 55*a* to 55*c*.

The heat generating device 80 has a configuration in which the three heat generating modules 55*a* to 55*c* are connected in parallel by the distribution pipe 81 and the collection pipe 82. The three heat generating modules 55*a* to 55*c* are not limited to being connected in parallel, and may be connected in series. When the three heat generating modules 55*a* to 55*c* are connected in series, the fluid outlet 24 of the heat generating module 55*a* and the fluid inlet 23 of the heat generating module 55*b* are connected, and the fluid outlet 24 of the heat generating module 55*b* and the fluid inlet 23 of the heat generating module 55*c* are connected, without using the distribution pipe 81 and the collection pipe 82. As a result, the fluid in the circulation line 30 passes through the heat generating module 55*a*, the heat generating module 55*b*, and the heat generating module 55*c* in this order, and is returned to the circulation line 30 again.

The three heat generating modules 55*a* to 55*c* are detachable from the distribution pipe 81 and the collection pipe 82. The distribution pipe 81 is provided with the control valve 76*b* corresponding to each of the heat generating modules 55*a* to 55*c*.

The heat generating device 80 has the same configuration as the heat generating device 70 of the second embodiment except that the three heat generating modules 55*a* to 55*c* are provided, and each of the heat generating modules 55*a* to 55*c* is connected by the distribution pipe 81 and the collection pipe 82. Therefore, the superheated steam generated by the heat generating device 80 is used for the steam turbine 71.

As described above, since the heat generating device 80 includes the three heat generating modules 55*a* to 55*c*, it is possible to achieve high output. In addition, since each of the heat generating modules 55*a* to 55*c* is detachable from the heat generating device 80 and can be easily replaced, the heat generating device 80 is excellent in maintainability.

The heat generating device 80 and the steam turbine 71 as a fluid utilization device constitute a heat utilization system 89. Since the heat generating device 80 and the heat utilization system 89 use the heat generating element 13 as an energy source, energy can be supplied inexpensively, cleanly, and safely.

A power generation efficiency in the case of operating the steam turbine using the heat generating device 80 was calculated. The power generation efficiency of the steam turbine was calculated by setting the steam pressure to 80 to 100 bar, and the exhaust pressure to 0.05 bar, the exhaust temperature to 32° C., and the exhaust wetness to 15% for the water vapor discharged from the steam turbine. The relationship between steam pressure and power generation efficiency is shown in Table 1.

TABLE 1

| | | | |
|---|---|---|---|
| Steam temperature [° C.] | 312 | 304 | 296 |
| Steam pressure [bar] | 100 | 90 | 80 |
| Steam flow rate ratio | 59.7 | 59.9 | 60.2 |
| Exhaust pressure [bar] | 0.05 | 0.05 | 0.05 |
| Exhaust wetness [%] | 15 | 15 | 15 |
| Turbine efficiency [%] | 53 | 54 | 56 |
| Power generation efficiency [%] | 20.6 | 21.1 | 21.6 |

As the steam pressure decreases, the saturation temperature decreases and the amount of water vapor generated increases. On the other hand, as the steam flow rate ratio increases, the drop in enthalpy is suppressed. As a result, the power generation efficiency of the steam turbine is improved. For example, when the steam pressure is 80 bar, the steam temperature is 296° C. Therefore, assuming that the heat generating element 13 generates excess heat at a heating temperature of about 300° C., the steam pressure is preferably higher than the 80 bar. When the steam pressure is set to 90 bar, since the steam temperature is 304° C., the heat generating element 13 generates excess heat, and 21.1% of the power generation efficiency of the steam turbine can be achieved.

Figure 9:
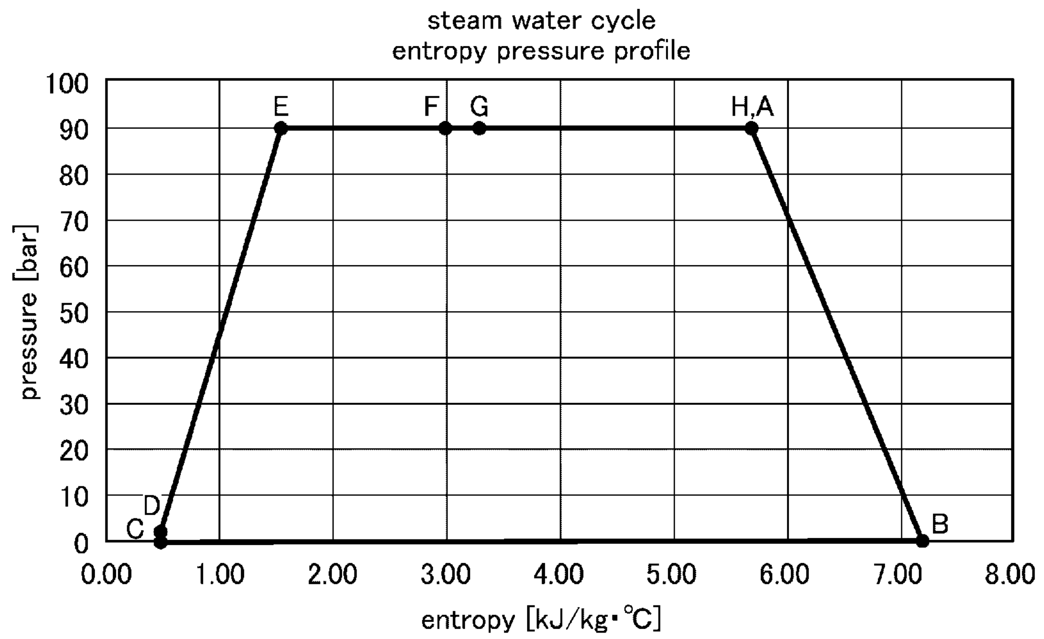
FIG. 9 is a graph showing a relationship between entropy and pressure of a Rankine cycle including the heat generating device and a steam turbine according to the third embodiment.
Figure 10:
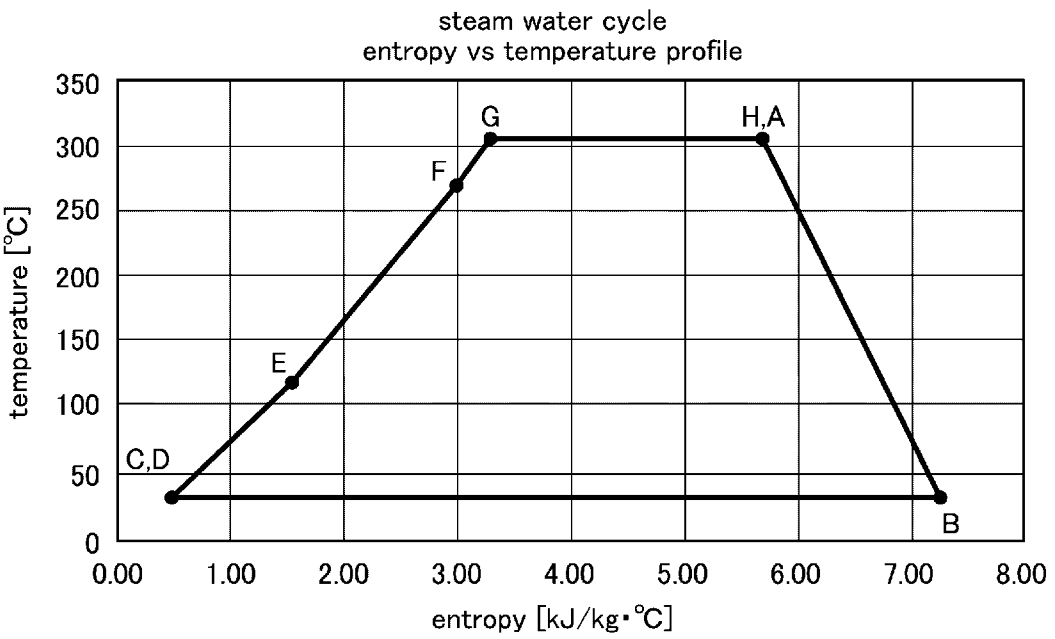
FIG. 10 is a graph showing a relationship between entropy and temperature of a Rankine cycle including the heat generating device and the steam turbine according to the third embodiment.
Figure 11:
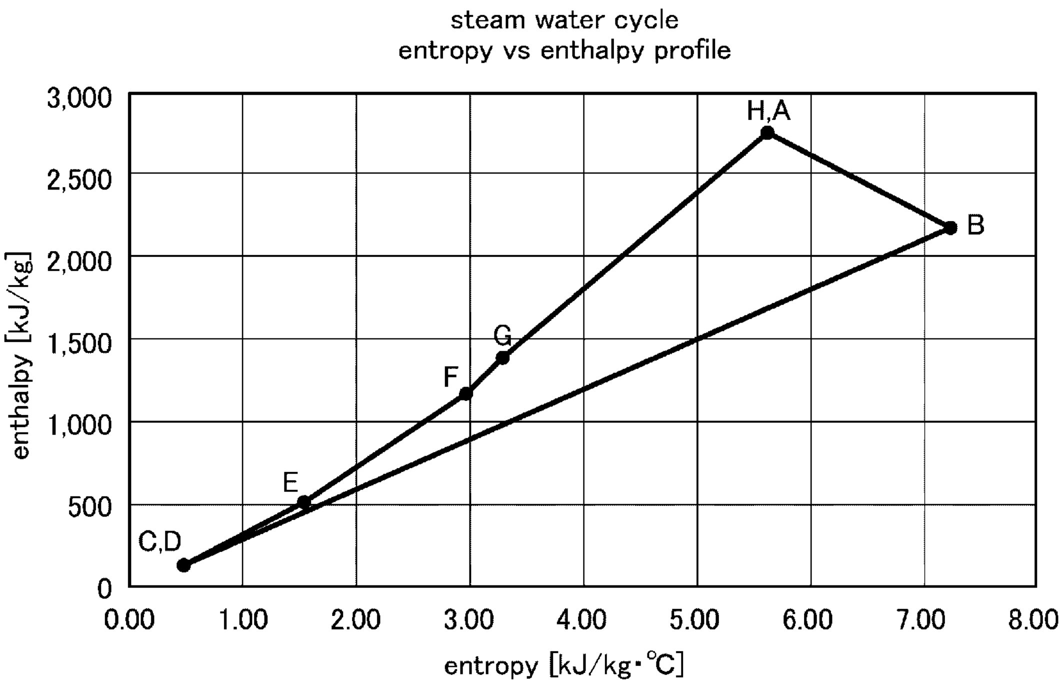
FIG. 11 is a graph showing a relationship between entropy and enthalpy of a Rankine cycle including the heat generating device and the steam turbine according to the third embodiment.

FIG. 9 is a graph showing a relationship between entropy and pressure of a Rankine cycle including the heat generating device 80 and the steam turbine 71 according to the third embodiment. In FIG. 9, the horizontal axis indicates entropy and the vertical axis indicates pressure. FIG. 10 is a graph showing a relationship between entropy and temperature of a Rankine cycle including the heat generating device 80 and the steam turbine 71 according to the third embodiment. In FIG. 10, the horizontal axis indicates entropy and the vertical axis indicates temperature. FIG. 11 is a graph showing a relationship between entropy and enthalpy of a Rankine cycle including the heat generating device 80 and the steam turbine 71 according to the third embodiment. In FIG. 11, the horizontal axis indicates entropy and the vertical axis indicates enthalpy. In FIG. 9 to FIG. 11, A indicates a state of the fluid at the inlet of the steam turbine 71, B indicates a state of the fluid at the outlet of the steam turbine 71, C indicates a state of the fluid at the cooling unit 32, D indicates a state of the fluid at the pump 77*a*, E indicates a state of the fluid at the inlet of the preheater 75, F indicates a state of the fluid at the outlet of the preheater 75, G indicates a state of the fluid at the saturation temperature in the flow path 14, and H indicates a state of the fluid flowing out from the flow path 14.

Fourth Embodiment

The fourth embodiment is configured to use a gas as a fluid. In this example, a case where air is used as the fluid will be described, but a gas other than air may be used. The same members as those in the above-described embodiments are denoted by the same reference numerals, and description thereof will be omitted.

Figure 12:
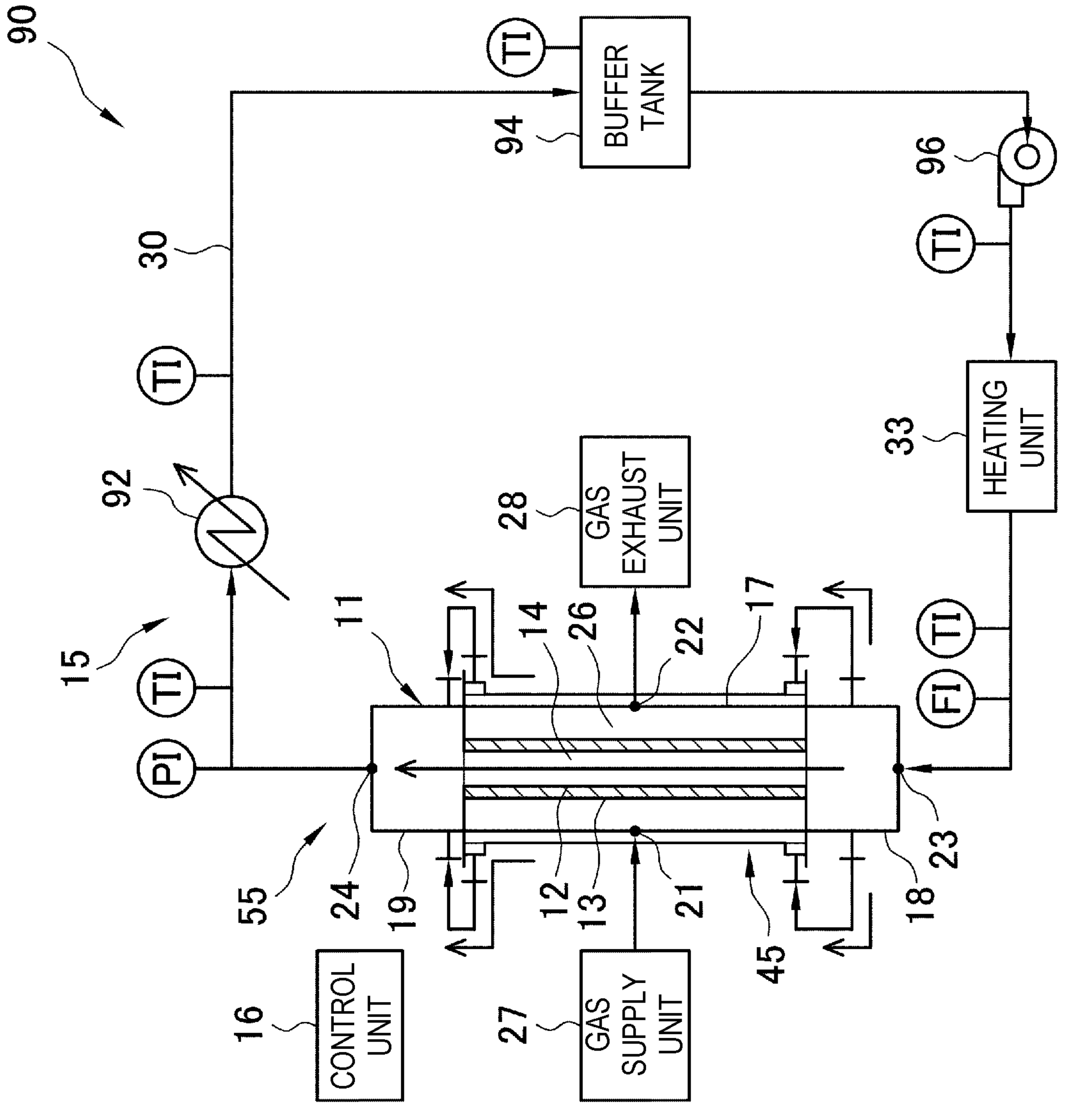
FIG. 12 is a schematic diagram showing a heat generating device according to a fourth embodiment.

As shown in FIG. 12, a heat generating device 90 includes one heat generating module 55, similarly to the heat generating device 10 of the first embodiment. The heat generating device 90 is configured such that a gas as a fluid flows into the flow path 14 and a gas as a fluid flows out from the flow path 14. To be specific, when the operation of the heat generating device 90 is started, air as a fluid is heated by the heating unit 33. When the air heated by the heating unit 33 flows into the flow path 14, the heat generating element 13 is heated via the tubular body 12. Thus, the heat generating element 13 generates excess heat. When the heat generating element 13 generates excess heat, air flowing through the flow path 14 is heated via the tubular body 12. As a result, high-temperature air (hereinafter referred to as high-temperature air) is generated in the flow path 14, and the high-temperature air flows out from the flow path 14.

Since the fourth embodiment is configured to use air as the fluid, it is possible to generate excess heat from the heat generating element 13 in a lower-pressure environment than when water is used as the fluid. For example, assuming that the heat generating element 13 is heated at a high temperature of about 500° C. to generate excess heat, the temperature and pressure of the air flowing into the flow path 14 are set to, for example, 500° C. and 1 bar. The temperature and pressure of the high-temperature air flowing out of the flow path 14 are, for example, 700° C. and 1 bar. The temperatures and pressures of the air and the high-temperature air are not limited to those described above.

In the fourth embodiment, a cooling unit 92 is provided in the circulation line 30 instead of the cooling unit 32 in the first embodiment. Similar to the first embodiment, the circulation line 30 is also provided with the heating unit 33. A description of the heating unit 33 is omitted.

The cooling unit 92 is electrically connected to the control unit 16, and the driving thereof is controlled by the control unit 16. The cooling unit 92 cools high-temperature air as a fluid flowing out from the flow path 14. In the cooling unit 92, for example, high-temperature air at 700° C. is cooled to 300° C.

The cooling unit 92 has a function as a boiler in this example. The cooling unit 92 as a boiler performs heat exchange between the high-temperature air and boiler water as a heat medium, and generates superheated steam from the boiler water. For example, in the cooling unit 92, the pressure is maintained at 130 bar, and superheated steam at 560° C. is generated by performing heat exchange between boiler water at 250° C. and high-temperature air at 700° C. The superheated steam generated in the boiler can be supplied to the steam turbine. When the steam turbine is driven, power can be generated by a generator.

In the fourth embodiment, in addition to the cooling unit 92 and the heating unit 33, a buffer tank 94 for storing air, a blower 96 for sending air, the temperature indicator TI, the pressure indicator PI, the flow rate indicator FI, and the like are provided in the circulation line 30.

As described above, the heat generating device 90 generates a high-temperature fluid (high-temperature air) by performing heat exchange between the heat generating element 13 provided on the outer surface of the tubular body 12 and the fluid (air) flowing through the flow path 14 formed by the inner surface of the tubular body 12. The high-temperature air as a high-temperature fluid can be used to generate superheated steam in the boiler (cooling unit 92). The superheated steam generated in the boiler can be used in a steam turbine. Therefore, since the heat generating device 90 uses the heat generating element 13 as an energy source, energy can be supplied inexpensively, cleanly and safely.

Fifth Embodiment

In the fifth embodiment, high-temperature air is used to generate superheated steam in a boiler, and the superheated steam is used as a working fluid for a steam turbine to generate electric power. The same members as those in the above-described embodiments are denoted by the same reference numerals, and description thereof will be omitted.

Figure 13:
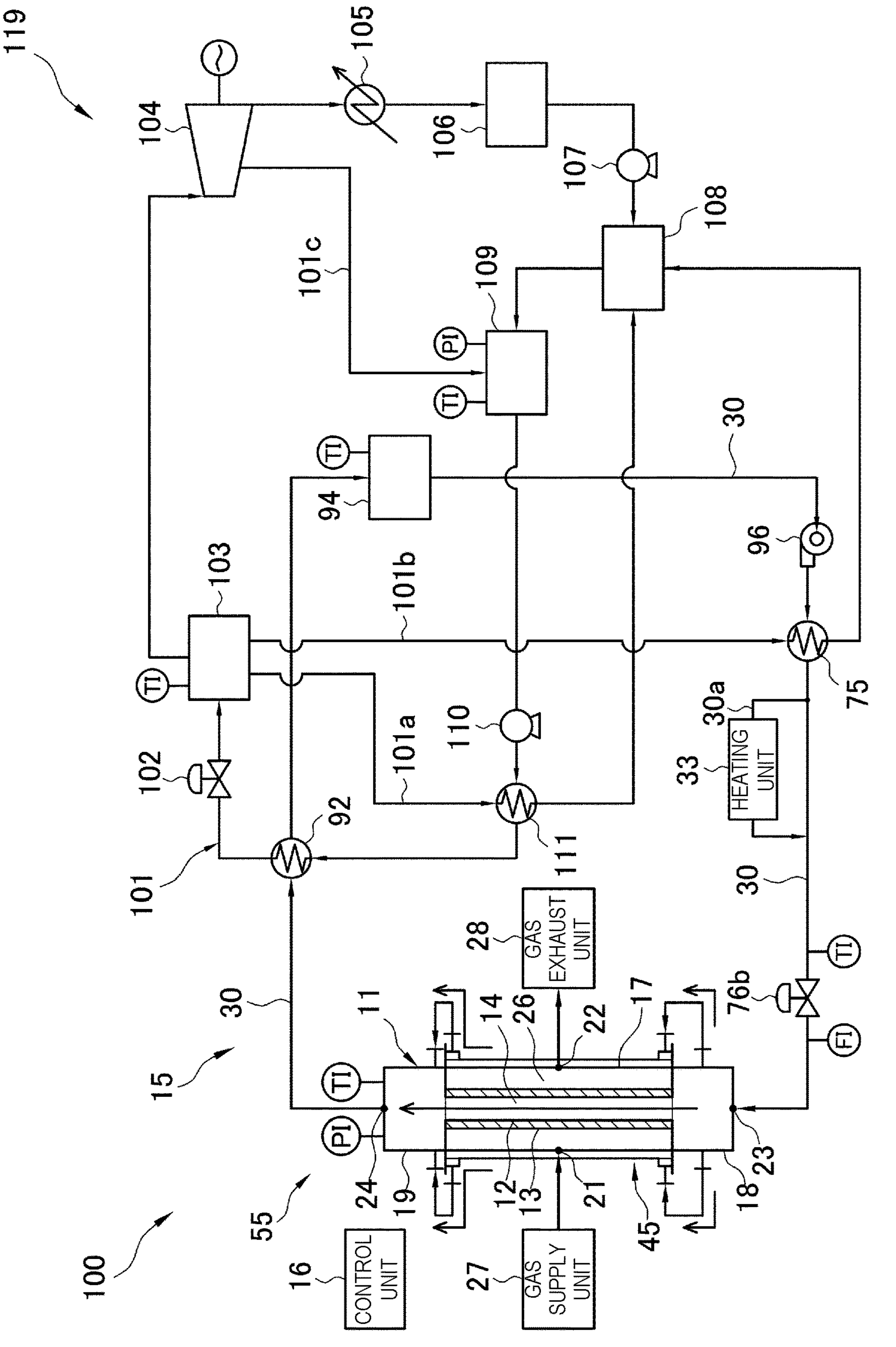
FIG. 13 is a schematic diagram showing a heat generating device according to a fifth embodiment.

As shown in FIG. 13, a heat generating device 100 includes one heat generating module 55, similarly to the heat generating device 90 of the fourth embodiment. The preheater 75 is provided in the circulation line 30 of the heat generating device 100, and the air sent by the blower 96 is preheated by the preheater 75. The heat generating device 100 has the same configuration as the heat generating device 90 of the fourth embodiment except that the preheater 75 is provided in the circulation line 30.

The heat generating device 100 is connected to a heat recovery line 101. The heat recovery line 101 is connected to the cooling unit 92 as a boiler provided in the circulation line 30, and is configured to circulate boiler water to the cooling unit 92.

The heat recovery line 101 is provided with a control valve 102, a steam tank 103, a steam turbine 104, a condenser 105, a reservoir tank 106, a pump 107, a buffer tank 108, a deaerator 109, a pump 110, and a preheater 111.

The control valve 102 adjusts the flow rate and pressure of the water vapor flowing out from the cooling unit 92 as a boiler. The steam tank 103 is for temporarily storing the water vapor. The steam tank 103 is provided with the temperature indicator TI. The temperature and pressure of the water vapor stored in the steam tank 103 are, for example, 560° C. and 130 bar.

The steam tank 103 is connected to the buffer tank 108 via a preheating pipe 101*a* and a preheating pipe 101*b*. The preheating pipe 101*a* is connected to the preheater 111. The preheating pipe 101*b* is connected to the preheater 75. A part of the water vapor stored in the steam tank 103 is supplied to the preheater 111 via the preheating pipe 101*a* and is supplied to the preheater 75 via the preheating pipe 101*b*.

The steam turbine 104 is a fluid utilization device that utilizes the superheated steam stored in the steam tank 103 as a working fluid. The steam turbine 104 has a rotary shaft connected to the power generator, and rotates about the rotary shaft by being supplied with superheated steam. The power generator generates power by rotation of the steam turbine 104. The water vapor discharged from the steam turbine 104 is, for example, cooled to 32.9° C. and depressurized to 0.05 bar. The water vapor contains fine mist-like water droplets.

The steam turbine 104 is an extraction turbine configured such that a part of steam can be extracted from an extraction portion provided in the middle of the turbine. The extraction portion of the steam turbine 104 is connected to the deaerator 109 via an extraction pipe 101*c*. The water vapor extracted from the extraction portion of the steam turbine 104 flows through the extraction pipe 101*c* and is supplied to the deaerator 109. The temperature and pressure of the water vapor flowing through the extraction pipe 101*c* are, for example, 251° C. and 12 bar.

The condenser 105 cools and condenses the water vapor discharged from the steam turbine 104. The reservoir tank 106 is for storing boiler water condensed by the condenser 105. The pump 107 is for sending the boiler water in the reservoir tank 106 to the buffer tank 108. The temperature and pressure of the boiler water sent by the pump 107 are, for example, 32.9° C. and 1 bar.

The buffer tank 108 is for storing boiler water. The buffer tank 108 is supplied with boiler water sent from the reservoir tank 106, boiler water generated by cooling the water vapor flowing through the preheating pipe 101*a* by the preheater 111, and boiler water generated by cooling the water vapor flowing through the preheating pipe 101*b* by the preheater 75. The boiler water stored in the buffer tank 108 is sent to the deaerator 109. The temperature and pressure of the boiler water sent to the deaerator 109 are, for example, 87.5° C. and 2 bar.

The deaerator 109 degasses oxygen contained in the boiler water sent from the buffer tank 108 by using the water vapor supplied from the extraction portion of the steam turbine 104 via the extraction pipe 101*c*. The deaerator 109 is provided with the temperature indicator TI and the pressure indicator PI. The pump 110 is for sending the boiler water deaerated by the deaerator 109 to the preheater 111. The temperature and pressure of the boiler water sent by the pump 110 are, for example, 120° C. and 2 bar.

The preheater 111 preheats the boiler water to be supplied to the cooling unit 92 by performing heat exchange between the water vapor flowing through the preheating pipe 101*a* and the boiler water supplied from the deaerator 109. The water vapor flowing through the preheating pipe 101*a* is cooled by heat exchange in the preheater 111, condensed, and sent to the buffer tank 108 as boiler water. The temperature and pressure of the water vapor flowing through the preheating pipe 101*a* are, for example, 560° C. and 130 bar. The temperature and pressure of the boiler water sent to the buffer tank 108 via the preheater 111 are, for example, 120° C. and 2 bar.

The preheater 75 preheats the air flowing into the flow path 14 by performing heat exchange between the water vapor flowing through the preheating pipe 101*b* and the air sent by the blower 96. The water vapor flowing through the preheating pipe 101*b* is cooled by heat exchange in the preheater 75, condensed, and sent to the buffer tank 108 as boiler water. The temperature and pressure of the water vapor flowing through the preheating pipe 101*b* are, for example, 560° C. and 130 bar. The temperature and pressure of the boiler water sent to the buffer tank 108 via the preheater 75 are, for example, 120° C. and 2 bar.

In the cooling unit 92 as a boiler, for example, heat exchange is performed between boiler water at 250° C. and 130 bar supplied from the preheater 111 and high-temperature air at 700° C. flowing out from the flow path 14, thereby generating superheated steam at 560° C. and 130 bar from the boiler water.

As described above, the heat generating device 100 generates a high-temperature fluid (high-temperature air) similarly to the heat generating device 90 of the fourth embodiment. The high-temperature air as a high-temperature fluid can be used to generate superheated steam in the boiler (cooling unit 92). The heat generating device 100 and the steam turbine 104 as a fluid utilization device constitute a heat utilization system 119. Since the heat generating device 100 and the heat utilization system 119 use the heat generating element 13 as an energy source, energy can be supplied inexpensively, cleanly, and safely.

Sixth Embodiment

While the heat generating device 100 of the fifth embodiment includes one heat generating module 55, in the sixth embodiment, a plurality of heat generating modules 55 are connected. In this example, a case where the three heat generating modules 55*a* to 55*c* are connected will be described, but the number of heat generating modules 55 is not particularly limited and can be increased or decreased so as to obtain a desired output. The same members as those in the above-described embodiments are denoted by the same reference numerals, and description thereof will be omitted.

Figure 14:
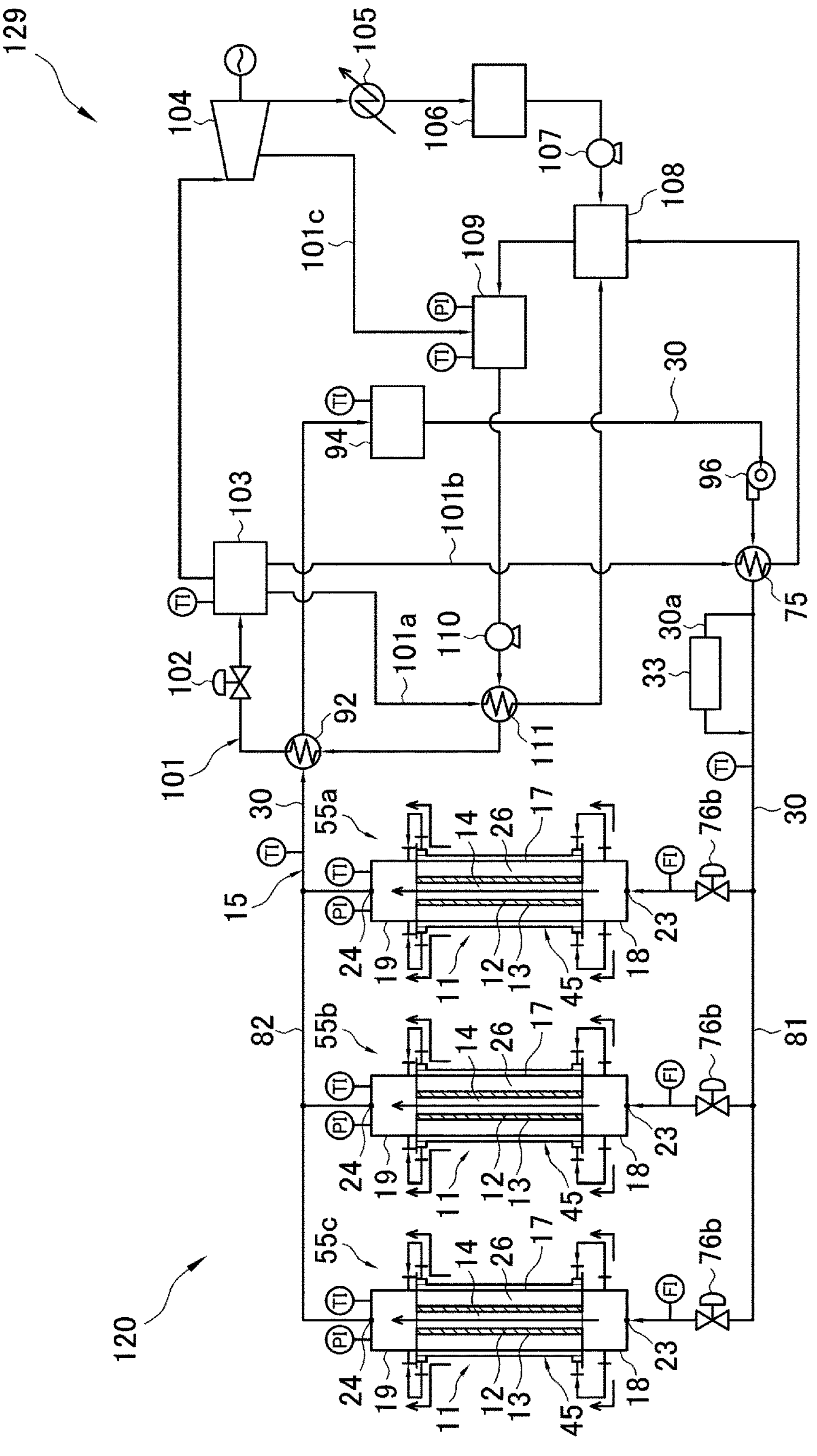
FIG. 14 is a schematic diagram showing a heat generating device according to a sixth embodiment.

As shown in FIG. 14, the heat generating device 120 includes the three heat generating modules 55*a* to 55*c*. Although not shown in FIG. 14, a heat generating device 120 includes the control unit 16, and the operation of each unit is controlled by the control unit 16. The gas supply unit 27 and the gas exhaust unit 28 are connected to the hollow portion 26. The heat generating device 120 has a configuration in which the three heat generating modules 55*a* to 55*c* are connected in parallel by the distribution pipe 81 and the collection pipe 82, but the three heat generating modules 55*a* to 55*c* can also be connected in series.

The heat generating device 120 has the same configuration as the heat generating device 100 of the fifth embodiment except that the three heat generating modules 55*a* to 55*c* are provided, and each of the heat generating modules 55*a* to 55*c* is connected by the distribution pipe 81 and the collection pipe 82. The heat generating device 120 is connected to the heat recovery line 101 in which the steam turbine 104 and the like are provided. Therefore, the high temperature air generated by the heat generating device 120 is used to generate superheated steam in the boiler (cooling unit 92).

As described above, since the heat generating device 120 includes the three heat generating modules 55*a* to 55*c*, it is possible to achieve high output. In addition, since each of the heat generating modules 55*a* to 55*c* is detachable from the heat generating device 120, and the heat generating modules 55*a* to 55*c* can be easily replaced, the heat generating device 120 is excellent in maintainability.

The heat generating device 120 and the steam turbine 104 as a fluid utilization device constitute a heat utilization system 129. Since the heat generating device 80 and the heat utilization system 129 use the heat generating element 13 as an energy source, energy can be supplied inexpensively, cleanly, and safely.

Figure 15:
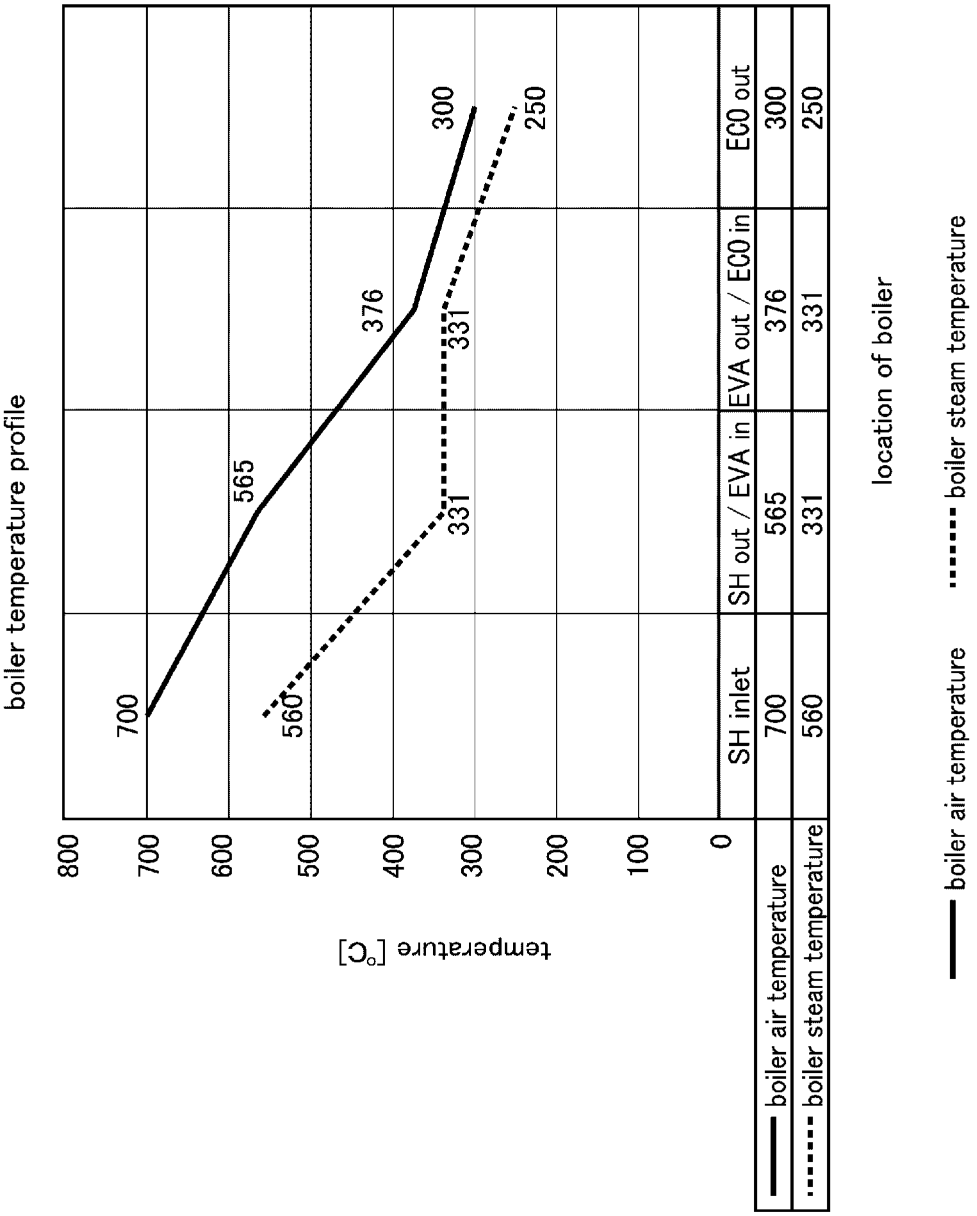
FIG. 15 is a graph showing a state of heat exchange in a boiler of the sixth embodiment.

FIG. 15 is a graph showing a state of heat exchange in the boiler (cooling unit 92) of the sixth embodiment. FIG. 15 shows the temperature drop of the high temperature air and the temperature rise of the boiler water when the pressure in the boiler is set to 130 bar and the high temperature air and the boiler water as a heating medium are in countercurrent indirect contact in the boiler. In FIG. 15, the vertical axis indicates the temperatures of boiler water and air. The horizontal axis indicates each portion in the boiler, "SH inlet" indicates a portion at the inlet of a superheater (SH) of the boiler, "SH out/EVA in" indicates a portion between the outlet of the superheater and the inlet of an evaporator (EVA), "EVA out/ECO in" indicates a portion between the outlet of the evaporator and the inlet of an economizer (ECO), and "ECO out" indicates a portion at the outlet of the economizer. "Boiler air" is high-temperature air. "Boiler steam" is boiler water or water vapor. The high-temperature air is supplied to the superheater of the boiler at 700° C. and is discharged from the economizer as air at 300° C. through heat exchange with boiler water. The boiler water is supplied to the economizer of the boiler at 250° C., heated in the economizer to 331° C., which is the saturation temperature at 130 bar, and becomes water vapor in the evaporator. This water vapor is further heated by the superheater and discharged from the boiler as superheated steam at 560° C.

Figure 16:
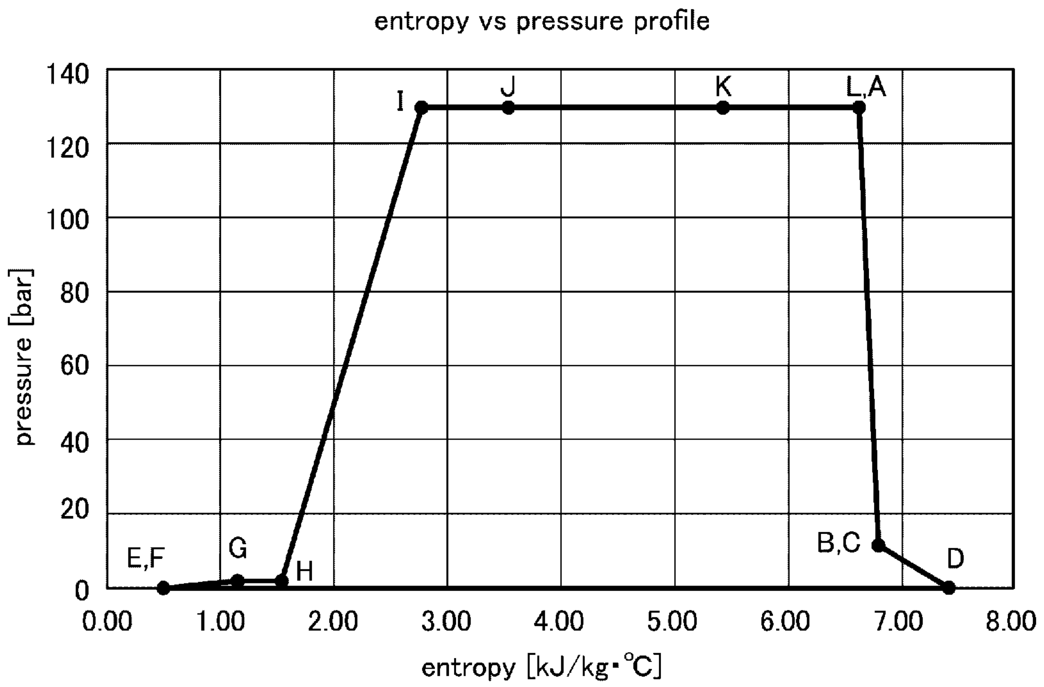
FIG. 16 is a graph showing a relationship between entropy and pressure of a Rankine cycle including the heat generating device and a steam turbine according to the sixth embodiment.
Figure 17:
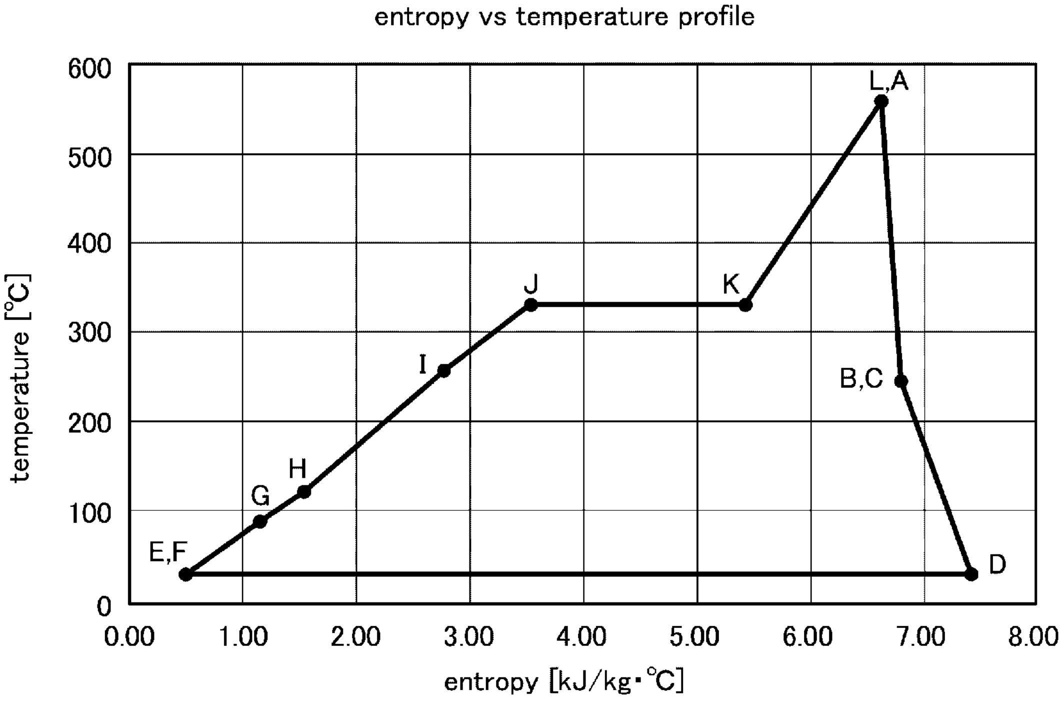
FIG. 17 is a graph showing a relationship between entropy and temperature of a Rankine cycle including the heat generating device and the steam turbine according to the sixth embodiment.
Figure 18:
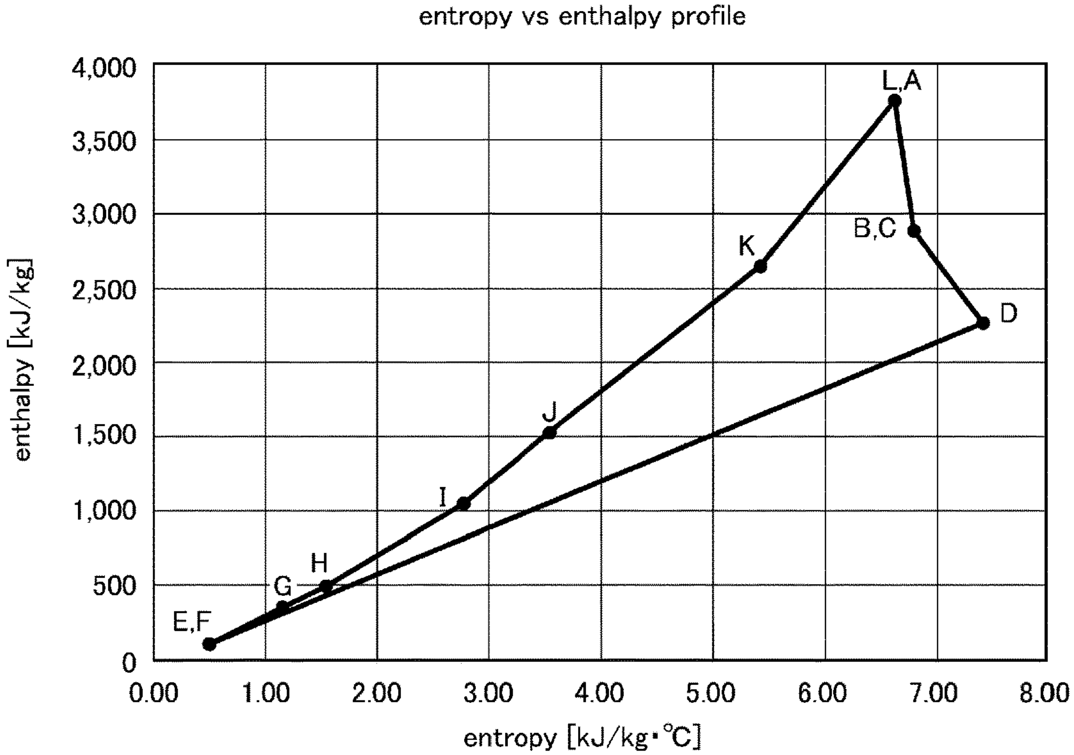
FIG. 18 is a graph showing a relationship between entropy and enthalpy of a Rankine cycle including the heat generating device and the steam turbine according to the sixth embodiment.

FIG. 16 is a graph showing a relationship between entropy and pressure of a Rankine cycle including the heat generating device 120 and the steam turbine 104 according to the sixth embodiment. In FIG. 16, the horizontal axis indicates entropy and the vertical axis indicates pressure. FIG. 17 is a graph showing a relationship between entropy and temperature of a Rankine cycle including the heat generating device 120 and the steam turbine 104 according to the sixth embodiment. In FIG. 17, the horizontal axis indicates entropy and the vertical axis indicates temperature. FIG. 18 is a graph showing a relationship between entropy and enthalpy of a Rankine cycle including the heat generating device 120 and the steam turbine 104 according to the sixth embodiment. In FIG. 18, the horizontal axis indicates entropy and the vertical axis indicates enthalpy. In FIG. 16 to FIG. 18, A indicates a state of the heat medium at the inlet of the steam turbine 104, B indicates a state of the heat medium at the extraction portion of the steam turbine 104, C indicates a state of the heat medium that exited the extraction portion of the steam turbine 104, D indicates a state of the heat medium at the outlet of the steam turbine 104, E indicates a state of the heat medium at the condenser 105, F indicates a state of the heat medium at the pump 107, G indicates a state of the heat medium at the outlet of the buffer tank 108, H indicates a state of the heat medium at the outlet of the deaerator 109, I indicates a state of the heat medium at the preheater 111, J indicates a state of the heat medium in which heat exchange is started in the boiler (cooling unit 92), K indicates a state of the heat medium having reached a saturation temperature in the boiler, and L indicates a state of the heat medium in the superheater in the boiler.

The present invention is not limited to the above-described embodiments, and can be appropriately modified without departing from the scope of the present invention.

The heat generating element 13 of each of the above-described embodiments has a configuration in which the multilayer film 58 including the first layer 59 and the second layer 60 is provided on the surface of the base 57, but the configuration of the heat generating element is not limited thereto. Another example of the heat generating element will be described below.

Figure 19:
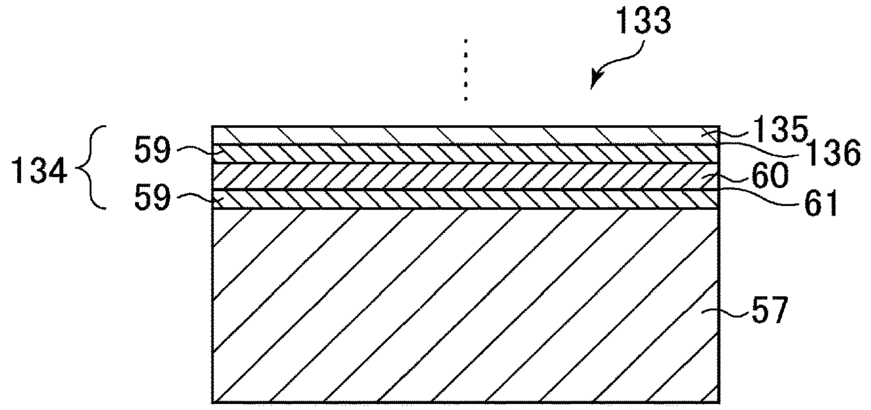
FIG. 19 is a cross-sectional view of a heat generating element having a first layer, a second layer, and a third layer.

For example, as shown in FIG. 19, a heat generating element 133 includes the base 57 and a multilayer film 134. The multilayer film 134 further includes a third layer 135 in addition to the first layer 59 and the second layer 60. Description of the base 57, the first layer 59, and the second layer 60 will be omitted. The third layer 135 is made of a hydrogen storage metal, a hydrogen storage alloy, or ceramics different from those of the first layer 59 and the second layer 60. The thickness of the third layer 135 is preferably less than 1000 nm. In FIG. 19, the first layer 59, the second layer 60, and the third layer 135 are stacked on the surface of the base 57 in the order of the first layer 59, the second layer 60, the first layer 59, and the third layer 135. The first layer 59, the second layer 60, and the third layer 135 may be stacked on the surface of the base 57 in the order of the first layer 59, the third layer 135, the first layer 59, and the second layer 60. That is, the multilayer film 134 has a stacking structure in which the first layer 59 is provided between the second layer 60 and the third layer 135. The multilayer film 134 may include one or more third layers 135. A heterogeneous material interface 136 formed between the first layer 59 and the third layer 135 is permeable to hydrogen atoms in the same manner as the heterogeneous material interface 61.

The third layer 135 is made of, for example, any one of Ni, Pd, Cu, Cr, Fe, Mg, Co, an alloy thereof, SiC, CaO, $Y_2O_3$, TiC, and $LaB_6$. The alloy for forming the third layer 135 is preferably an alloy made of two or more of Ni, Pd, Cu, Cr, Fe, Mg, and Co. As the alloy for forming the third layer 135, an alloy obtained by adding an additive element to Ni, Pd, Cu, Cr, Fe, Mg, or Co may be used.

In particular, the third layer 135 is preferably made of any one of CaO, $Y_2O_3$, TiC, $LaB_6$, SrO, and BaO. In the heat generating element 133 having the third layer 135 made of any one of CaO, $Y_2O_3$, TiC, $LaB_6$, SrO, and BaO, the amount of hydrogen occlusion increases, the amount of hydrogen permeating through the heterogeneous material interface 61 and the heterogeneous material interface 136 increases, and a high output of excess heat can be achieved.

The thickness of the third layer 135 made of any one of CaO, $Y_2O_3$, TiC, $LaB_6$, SrO, and BaO is preferably 10 nm or less. Accordingly, hydrogen atoms easily permeate through the multilayer film 134. The third layer 135 made of any one of CaO, $Y_2O_3$, TiC, $LaB_6$, SrO, and BaO may not be formed into a complete film shape and may be formed into an island shape. The first layer 59 and the third layer 135 are preferably formed continuously in a vacuum state. Accordingly, between the first layer 59 and the third layer 135, no natural oxide film is formed and only the heterogeneous material interface 136 is formed.

As a combination of the first layer 59, the second layer 60, and the third layer 135, it is preferably Pd—CaO—Ni, Pd—$Y_2O_3$—Ni, Pd—TiC—Ni, Pd—$LaB_6$—Ni, Ni—CaO—Cu, Ni—$Y_2O_3$—Cu, Ni—TiC—Cu, Ni—$LaB_6$—Cu, Ni—Co—Cu, Ni—CaO—Cr, Ni—$Y_2O_3$—Cr, Ni—TiC—Cr, Ni—$LaB_6$—Cr, Ni—CaO—Fe, Ni—$Y_2O_3$—Fe, Ni—TiC—Fe, Ni—$LaB_6$—Fe, Ni—Cr—Fe, Ni—CaO—Mg, Ni—$Y_2O_3$—Mg, Ni—TiC—Mg, Ni—$LaB_6$—Mg, Ni—CaO—Co, Ni—$Y_2O_3$—Co, Ni—TiC—Co, Ni—$LaB_6$—Co, Ni—CaO—SiC, Ni—$Y_2O_3$—SiC, Ni—TiC—SiC, or Ni—$LaB_6$—SiC when types of elements are expressed as "first layer 59-third layer 135-second layer 60".

Figure 20:
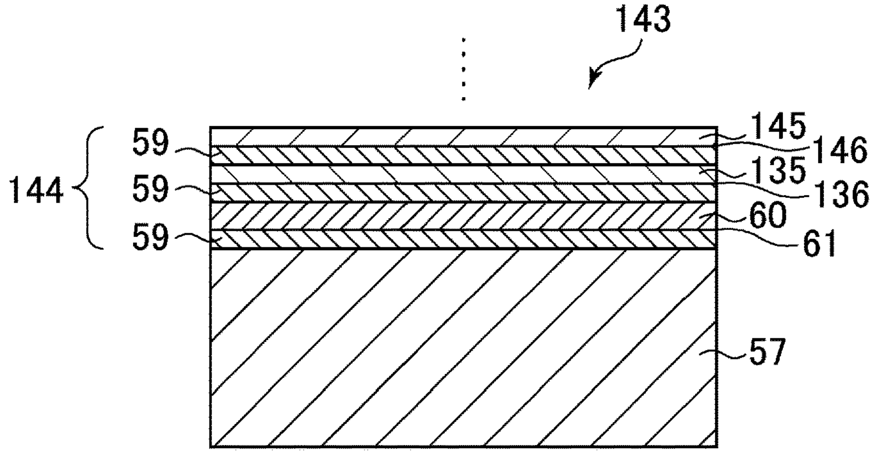
FIG. 20 is a cross-sectional view of the heat generating element having the first layer, the second layer, the third layer, and a fourth layer.

As shown in FIG. 20, a heat generating element 143 includes the base 57 and a multilayer film 144. The multilayer film 144 further includes a fourth layer 145 in addition to the first layer 59, the second layer 60, and the third layer 135. The fourth layer 145 is made of a hydrogen storage metal, a hydrogen storage alloy, or ceramics different from those of the first layer 59, the second layer 60, and the third layer 135. The thickness of the fourth layer 145 is preferably less than 1000 nm. In FIG. 20, the first layer 59, the second layer 60, the third layer 135, and the fourth layer 145 are stacked on the surface of the base 57 in the order of the first layer 59, the second layer 60, the first layer 59, the third layer 135, the first layer 59, and the fourth layer 145. The first layer 59, the second layer 60, the third layer 135, and the fourth layer 145 may be stacked on the surface of the base 57 in the order of the first layer 59, the fourth layer 145, the first layer 59, the third layer 135, the first layer 59, and the second layer 60. That is, the multilayer film 144 has a stacking structure in which the second layer 60, the third layer 135, and the fourth layer 145 are stacked in an arbitrary order, and the first layers 59 are provided between each combination of the second layer 60, and the third layer 135, and the fourth layer 145. The multilayer film 144 may include one or more fourth layers 145. A heterogeneous material interface 146 formed between the first layer 59 and the fourth layer 145 is permeable to hydrogen atoms in the same manner as the heterogeneous material interface 61 and the heterogeneous material interface 136.

The fourth layer 145 is made of, for example, any one of Ni, Pd, Cu, Cr, Fe, Mg, Co, an alloy thereof, SiC, CaO, $Y_2O_3$, TiC, and $LaB_6$. The alloy for forming the fourth layer 145 is preferably an alloy made of two or more of Ni, Pd, Cu, Cr, Fe, Mg, and Co. As the alloy for forming the fourth layer 145, an alloy obtained by adding an additive element to Ni, Pd, Cu, Cr, Fe, Mg, or Co may be used.

In particular, the fourth layer 145 is preferably made of any one of CaO, $Y_2O_3$, TiC, $LaB_6$, SrO, and BaO. In the heat generating element 143 having the fourth layer 145 made of any one of CaO, $Y_2O_3$, TiC, $LaB_6$, SrO, and BaO, the amount of hydrogen occlusion increases, the amount of hydrogen permeating through the heterogeneous material interface 61, the heterogeneous material interface 136, and the heterogeneous material interface 146 increases, and a high output of excess heat can be achieved. The thickness of the fourth layer 145 made of any one of CaO, $Y_2O_3$, TiC, $LaB_6$, SrO, and BaO is preferably 10 nm or less. Accordingly, hydrogen atoms easily permeate through the multilayer film 144. The fourth layer 145 made of any one of CaO, $Y_2O_3$, TiC, $LaB_6$, SrO, and BaO may not be formed into a complete film shape and may be formed into an island shape. The first layer 59 and the fourth layer 145 are preferably formed continuously in a vacuum state. Accordingly, between the first layer 59 and the fourth layer 145, no natural oxide film is formed and only the heterogeneous material interface 146 is formed.

As a combination of the first layer 59, the second layer 60, the third layer 135, and the fourth layer 145, it is preferably Ni—CaO—Cr—Fe, Ni—$Y_2O_3$—Cr—Fe, Ni—TiC—Cr—Fe, or Ni—$LaB_6$—Cr—Fe when types of elements are expressed as "first layer 59-fourth layer 145-third layer 135-second layer 60".

The configurations of various multilayer films such as the multilayer film 58, the multilayer film 134, and the multilayer film 144, for example, the ratio of the thicknesses of the respective layers, the number of the respective layers, and the materials may be appropriately changed in accordance with the temperature at which the multilayer film is used.

Figure 21:
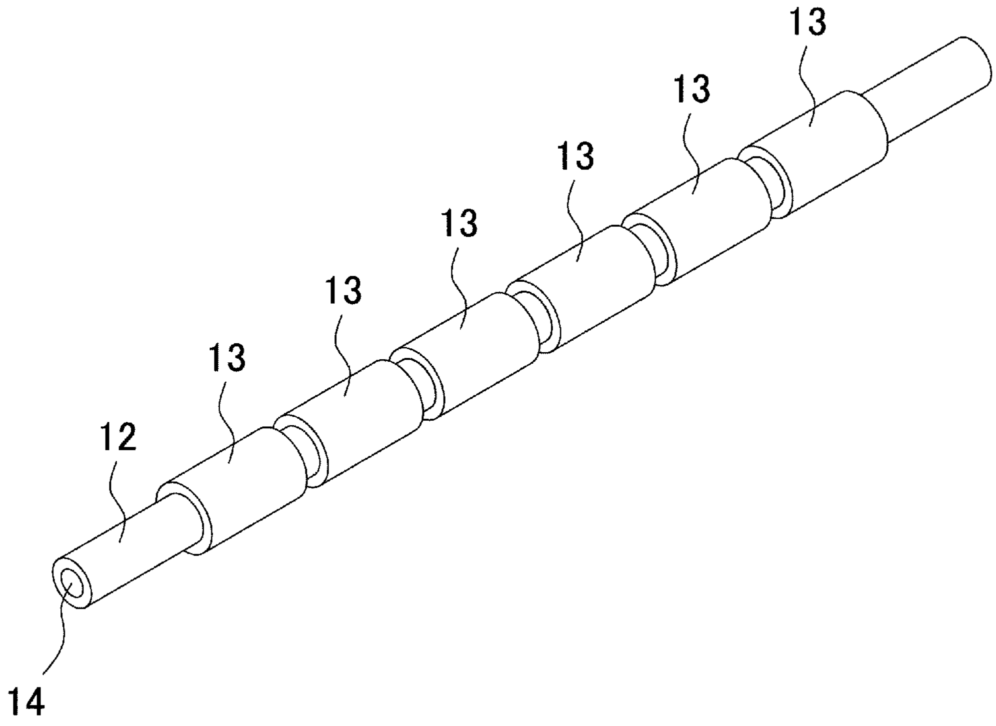
FIG. 21 is a perspective view of a tubular body provided with a plurality of heat generating elements.

In each of the above-described embodiments, one heat generating element 13 is provided on the entire outer surface of one tubular body 12, but as shown in FIG. 21, a plurality of heat generating elements 13 may be provided on the outer surface of one tubular body 12 at intervals from each other. Since there is a gap between each heat generating element 13, even when the tubular body 12 is thermally expanded, damage to each heat generating element 13 is prevented. Further, a plurality of heat generating elements 133 (see FIG. 19) may be provided on the outer surface of one tubular body 12 at intervals from each other. A plurality of heat generating elements 143 (see FIG. 20) may also be provided on the outer surface of one tubular body 12 at intervals from each other.

Although the external fluid line 45 has the plurality of first pipes 47 in each of the above-described embodiments, the external fluid line 45 may be configured to cover the entire outer surface of the main body 17 with one first pipe 47. Further, one first pipe 47 may be wound spirally along the outer surface of the main body 17.

The first ring tube 48 may have a through hole connected to the fluid inflow chamber 18. Since the first ring pipe 48 and the fluid inflow chamber 18 are directly connected by the through hole, the second pipe 50 may be omitted.

The second ring pipe 49 may have a through hole connected to the fluid outflow chamber 19. Since the second ring pipe 49 and the fluid outflow chamber 19 are directly connected by the through hole, the third pipe 51 may be omitted.

A fluid heated by any heat generating element among the heat generating element 13, the heat generating element 133, and the heat generating element 143 can be used as a heat energy source to separate carbon dioxide ($CO_2$) from exhaust gas discharged from a combustion device such as a boiler. $CO_2$ contained in the exhaust gas can be recovered by supplying a fluid heated by the heat generating element to a $CO_2$ separation and recovery apparatus which performs a chemical absorption method or a physical adsorption method. In the chemical absorption method, $CO_2$ contained in the exhaust gas is absorbed in an absorbing liquid such as an amine compound aqueous solution, and the absorbing liquid that has absorbed the $CO_2$ is heated to discharge the $CO_2$ from the absorbing liquid. In the physical adsorption method, $CO_2$ contained in the exhaust gas is adsorbed on an adsorbent such as active carbon or zeolite, and the adsorbent on which the $CO_2$ is adsorbed is heated to desorb the $CO_2$ from the adsorbent. In the chemical absorption method, a fluid heated by a heat generating element can be used as a heat energy source for heating the absorbing liquid that has absorbed the $CO_2$. Further, in the physical adsorption method, a fluid heated by a heat generating element can be used as a heat energy source for heating the adsorbent on which the $CO_2$ is adsorbed.

The fluid heated by the heat generating element is used as a thermal energy source, and can be converted into methane ($CH_4$) by reacting $CO_2$ separated and recovered by a $CO_2$ separation and recovery device with hydrogen ($H_2$). By bringing a raw material gas containing $CO_2$ and $H_2$ into contact with a catalyst using the catalyst for promoting the reaction between $CO_2$ and $H_2$ (methanation reaction), $CH_4$ is generated from the raw material gas, but the reaction does not proceed sufficiently if the temperature of the raw material gas is low. Therefore, the methanation reaction can be allowed to proceed by using the fluid heated by a heat generating element as a heat energy source for heating the raw material gas containing $CO_2$ and $H_2$.

In an IS cycle in which hydrogen is produced from water using heat energy or an ISN cycle in which ammonia ($NH_3$) is produced from water and nitrogen ($N_2$) using heat energy, a fluid heated by heat generating element can be used as a heat energy source. In the IS cycle, water, iodine (I), and sulfur (S) are reacted to produce hydrogen iodide (HI), and the hydrogen iodide is then pyrolyzed to produce hydrogen. A fluid heated by the heat generating element can be used as a heat energy source for pyrolyzing hydrogen iodide. In the ISN cycle, nitrogen is reacted with hydrogen iodide produced in the IS cycle to produce ammonium iodide ($NH_4I$), and the ammonium iodide is then pyrolyzed to produce ammonia. A fluid heated by the heat generating element can be used as a heat energy source for pyrolyzing ammonium iodide.

Figure 22:
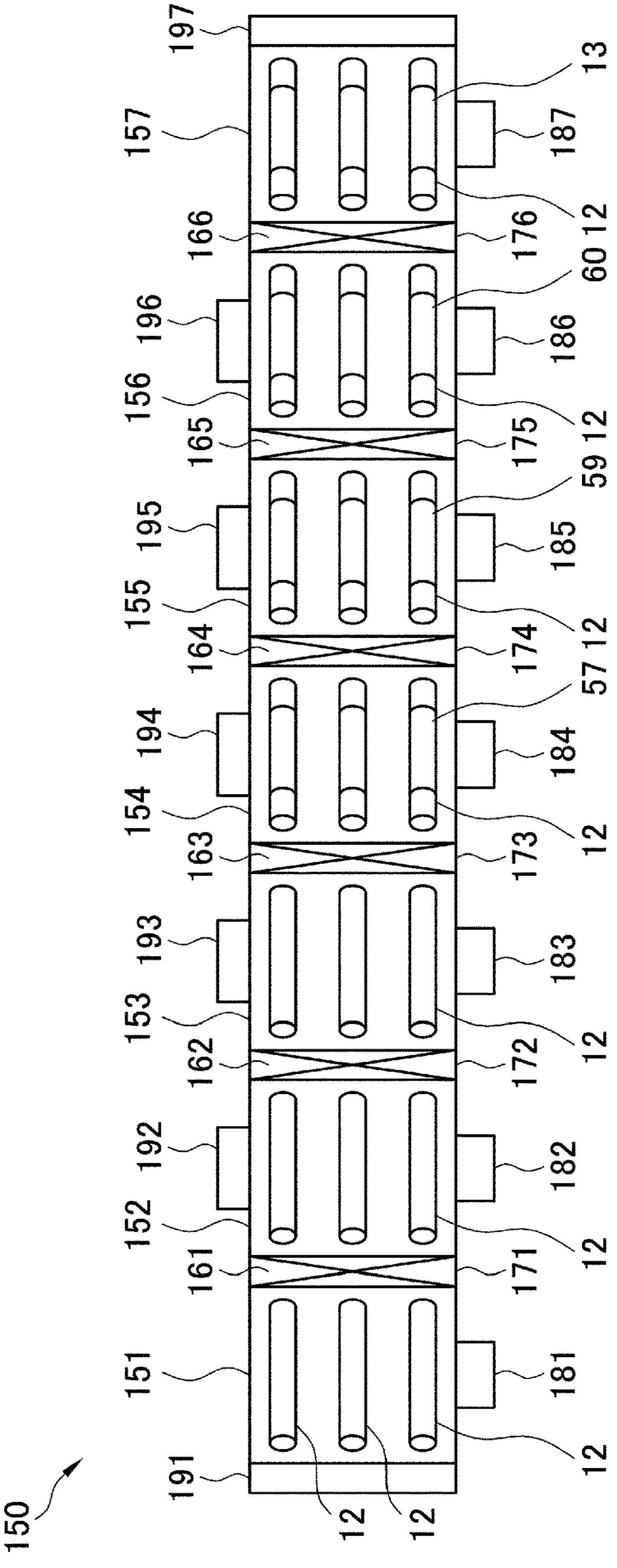
FIG. 22 is a schematic diagram of a heat generating element production apparatus for producing the heat generating element.

FIG. 22 shows a heat generating element production apparatus 150 for producing the heat generating element 13 using a sputtering method. In this example, the heat generating element production apparatus 150 performs a DC (Direct Current) magnetron sputtering method as the sputtering method, and directly forms the heat generating element 13 on the outer surface of the tubular body 12.

The heat generating element production apparatus 150 includes a load chamber 151 for carrying in the tubular body 12, a preheating chamber 152 for preheating the tubular body 12, a sputter etching chamber 153 for sputter etching the surface of the tubular body 12, a base forming chamber 154 for forming the base 57 on the tubular body 12, a first layer forming chamber 155 for forming the first layer 59 on the base 57, a second layer forming chamber 156 for forming the second layer 60 on the base 57, and an unload chamber 157 for carrying out the tubular body 12. In this example, the heat generating element production apparatus 150 carries a plurality of tubular bodies 12 into the load chamber 151 and directly forms the heat generating element 13 on the outer surface of each tubular body 12, but may carry one tubular body 12 into the load chamber 151 and directly form the heat generating element 13 on the outer surface of the tubular body 12.

In this example, the heat generating element production apparatus 150 includes a first gate valve 161 provided between the load chamber 151 and the preheating chamber 152, a second gate valve 162 provided between the preheating chamber 152 and the sputter etching chamber 153, a third gate valve 163 provided between the sputter etching chamber 153 and the base forming chamber 154, a fourth gate valve 164 provided between the base forming chamber 154 and the first layer forming chamber 155, a fifth gate valve 165 provided between the first layer forming chamber 155 and the second layer forming chamber 156, and a sixth gate valve 166 provided between the second layer forming chamber 156 and the unload chamber 157, wherein the load chamber 151, the preheating chamber 152, the sputter etching chamber 153, the base forming chamber 154, the first layer forming chamber 155, the second layer forming chamber 156, and the unload chamber 157 are separated from each other. Although not illustrated, the heat generating element production apparatus 150 further includes a conveyance mechanism that conveys the tubular body 12 from the load chamber 151 to the unload chamber 157, and a rotation mechanism that rotates the tubular body 12 about the central axis of the tubular body 12.

The first gate valve 161 opens and closes a first carrying in/out unit 171 between the load chamber 151 and the preheating chamber 152. The second gate valve 162 opens and closes a second carrying in/out unit 172 between the preheating chamber 152 and the sputter etching chamber 153. The third gate valve 163 opens and closes a third carrying in/out unit 173 between the sputter etching chamber 153 and the base forming chamber 154. The fourth gate valve 164 opens and closes a fourth carrying in/out unit 174 between the base forming chamber 154 and the first layer forming chamber 155. The fifth gate valve 165 opens and closes a fifth carrying in/out unit 175 between the first layer forming chamber 155 and the second layer forming chamber 156. The sixth gate valve 166 opens and closes a sixth carrying in/out unit 176 between the second layer forming chamber 156 and the unload chamber 157.

The heat generating element production apparatus 150 includes a first vacuum generation unit 181 for evacuating the load chamber 151, a second vacuum generation unit 182 for evacuating the preheating chamber 152, a third vacuum generation unit 183 for evacuating the sputter etching chamber 153, a fourth vacuum generation unit 184 for evacuating the base forming chamber 154, a fifth vacuum generation unit 185 for evacuating the first layer forming chamber 155, a sixth vacuum generation unit 186 for evacuating the second layer forming chamber 156, and a seventh vacuum generation unit 187 for evacuating the unload chamber 157. As the first to seventh vacuum generation units 181 to 187, for example, a dry pump, a turbo-molecular pump, or the like is used.

The load chamber 151 has a carry-in unit 191 for carrying in the tubular body 12. After the tubular body 12 is carried in from the carry-in unit 191, the load chamber 151 is evacuated by the first vacuum generation unit 181 in a state where the carry-in unit 191 and the first gate valve 161 are closed. After the load chamber 151 is evacuated, the first gate valve 161 is opened, and the tubular body 12 is conveyed from the load chamber 151 to the preheating chamber 152 via the first carrying in/out unit 171.

The preheating chamber 152 is evacuated to, for example, about 1E-3 Pa by the second vacuum generation unit 182 in a state where the first gate valve 161 and the second gate valve 162 are closed. The preheating chamber 152 has a heating unit 192, and the tubular body 12 is heated by the heating unit 192 while rotating the tubular body 12. The heating unit 192 removes moisture adsorbed on the surface of the tubular body 12 by heating the tubular body 12 to a surface temperature of, for example, 200 to 350° C. The heating unit 192 is not particularly limited as long as it can heat the tubular body 12 to a desired temperature. For example, a lamp heating method, an infrared heating method, an induction heating method, or the like can be used. After the heating, the second gate valve 162 is opened, and the tubular body 12 is conveyed from the preheating chamber 152 to the sputter etching chamber 153 via the second carrying in/out unit 172.

The sputter etching chamber 153 is evacuated by the third vacuum generation unit 183 in a state where the second gate valve 162 and the third gate valve 163 are closed. The sputter etching chamber 153 has a sputter etching electrode 193, and sputter etching of the tubular body 12 is performed by the sputter etching electrode 193 while rotating the tubular body 12. By using the sputter etching electrode 193, for example, the flow rate of Ar gas is adjusted to set the Ar pressure to about 0.1 to 1 Pa, and a radio frequency (RF) of 13.56 MHz is applied to remove organic substances and metallic oxides on the surface of the tubular body 12. After the sputter etching, the third gate valve 163 is opened, and the tubular body 12 is conveyed from the sputter etching chamber 153 to the base forming chamber 154 via the third carrying in/out unit 173.

The base forming chamber 154 is evacuated by the fourth vacuum generating unit 184 in a state where the third gate valve 163 and the fourth gate valve 164 are closed. The base forming chamber 154 has a base forming sputter electrode 194, and forms the base 57 on the tubular body 12 by the base forming sputter electrode 194 while rotating the tubular body 12. The base forming sputter electrode 194 has a target material (not shown) of a hydrogen storage metal, a hydrogen storage alloy, or a proton conductor forming the base 57. The front side of the target material faces the tubular body 12. In this example, a magnet (not shown) is arranged on the rear side of the target material. By using the base forming sputter electrode 194, for example, the flow rate of Ar gas is adjusted to set the Ar pressure to about 0.1 to 1 Pa, and the DC power of about 0.1 to 500 $kW/m^2$ is applied to form the base 57 on the tubular body 12. The thickness of the base 57 can be controlled by adjusting the magnitude of the DC power and the rotation speed of the tubular body 12. After the formation of the base 57, the fourth gate valve 164 is opened, and the tubular body 12 is conveyed from the base forming chamber 154 to the first layer forming chamber 155 via the fourth carrying in/out unit 174.

The first layer forming chamber 155 is evacuated to, for example, about 1E-5 Pa by the fifth vacuum generation unit 185 in a state where the fourth gate valve 164 and the fifth gate valve 165 are closed. The first layer forming chamber 155 has a first layer deposition sputter electrode 195, and forms the first layer 59 on the base 57 by the first layer deposition sputter electrode 195 while rotating the tubular body 12. The first layer deposition sputter electrode 195 has a target material (not shown) of a hydrogen storage metal or a hydrogen storage alloy forming the first layer 59. The front side of the target material faces the base 57. In this example, a magnet (not shown) is arranged on the rear side of the target material. By using the first layer deposition sputter electrode 195, for example, the flow rate of Ar gas is adjusted to set the Ar pressure to about 0.1 to 1 Pa, and the DC power of about 0.1 to 500 $kW/m^2$ is applied to form the first layer 59 on the base 57. The thickness of the first layer 59 can be controlled by adjusting the magnitude of the DC power and the rotation speed of the tubular body 12. After the formation of the first layer 59, the fifth gate valve 165 is opened, and the tubular body 12 is conveyed from the first layer forming chamber 155 to the second layer forming chamber 156 via the fifth carrying in/out unit 175.

The second layer forming chamber 156 is evacuated to, for example, about 1E-5 Pa by the sixth vacuum generation unit 186 in a state where the fifth gate valve 165 and the sixth gate valve 166 are closed. The second layer forming chamber 156 has a second layer deposition sputter electrode 196, and forms the second layer 60 on the base 57 by the second layer deposition sputter electrode 196 while rotating the tubular body 12. The second layer deposition sputter electrode 196 has a target material (not shown) of a hydrogen storage metal, a hydrogen storage alloy, or ceramics forming the second layer 60. The front side of the target material faces the base 57.

In this example, a magnet (not shown) is arranged on the rear side of the target material. By using the second layer deposition sputter electrode 196, for example, the flow rate of Ar gas is adjusted to set the Ar pressure to about 0.1 to 1 Pa, and the DC power of about 0.1 to 500 $kW/m^2$ is applied to form the second layer 60 on the base 57. When ceramics are used as the target material for forming the second layer 60, the second layer deposition sputter electrode 196 is configured to apply RF. In the second layer forming chamber 156, the multilayer film 58 (see FIG. 5) composed of the first layer 59 and the second layer 60 is formed on the surface of the base 57. In this way, the heat generating element 13 is directly formed on the outer surface of the tubular body 12. The thickness of the second layer 60 can be controlled by adjusting the magnitude of the DC power and the rotation speed of the tubular body 12. After the formation of the second layer 60, the sixth gate valve 166 is opened, and the tubular body 12 is conveyed from the second layer forming chamber 156 to the unload chamber 157 via the sixth carrying in/out unit 176.

The unload chamber 157 has a carry-out unit 197 for carrying out the tubular body 12, and the sixth vacuum generation unit 186 is opened to the atmosphere in a state where the carry-out unit 197 and the sixth gate valve 166 are closed. The tubular body 12 on which the heat generating element 13 is formed can be taken out from the unload chamber 157 in an atmospheric-pressure state via the carrying-out unit 197.

As described above, in the heat generating element production apparatus 150, the load chamber 151, the preheating chamber 152, the sputter etching chamber 153, the base forming chamber 154, the first layer forming chamber 155, the second layer forming chamber 156, and the unload chamber 157 are separated from each other by the first to sixth gate valves 161 to 166, and thus the base 57, the first layer 59, and the second layer 60 can be continuously formed in a vacuum state. Therefore, in the heat generating element production apparatus 150, the heat generating element 13 in which the natural oxide film is not formed between the first layer 59 and the second layer 60 and only the heterogeneous material interface 61 is formed can be directly formed on the outer surface of the tubular body 12.

In FIG. 22, the heat generating element production apparatus 150 is provided with the first to seventh vacuum generation units 181 to 187 that evacuate the respective processing chambers, but the vacuum generation unit may be shared by several processing chambers. When the vacuum generation unit is shared by several processing chambers, the pressure in each processing chamber can be controlled by adjusting the flow rate of the Ar gas using, for example, an orifice valve.

The rotation speed of the tubular body 12 is set based on the thickness of a film to be etched or film-formed, the etching rate, or the film forming rate. When the thickness of a film to be etched or film-formed is X (nm) and the etching rate or film forming rate is Y (nm/min), it is desirable that the rotation speed Z (rpm) of the tubular body 12 satisfies $Z>10\times(Y/X)$. This is because the heat generating element 13 can have a film thickness uniformity (variation in film thickness) of 10% or less. For example, when X=10 (nm) and Y=50 (nm/min), Z>50 (rpm).

Figure 23:
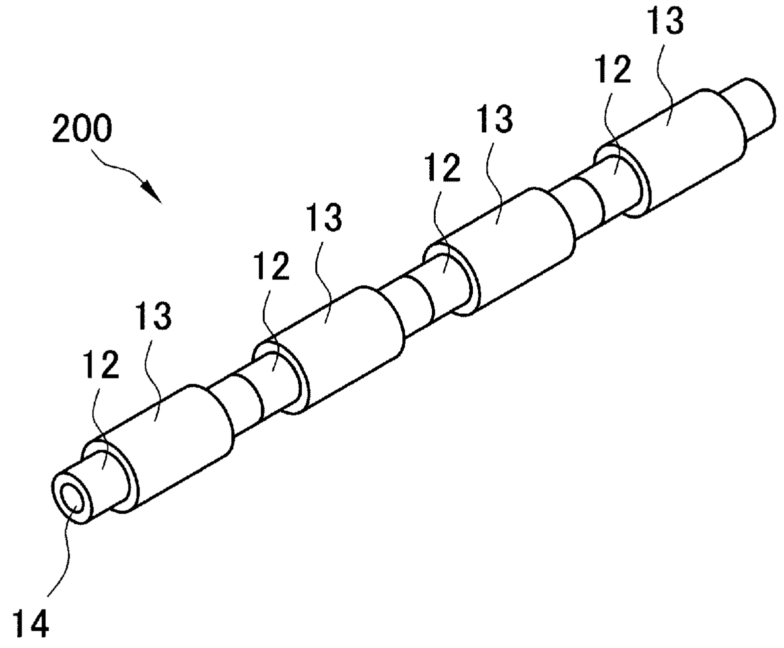
FIG. 23 is a perspective view of a heat generating unit in which the tubular bodies formed with the heat generating elements are connected to each other.

FIG. 23 shows a heat generating unit 200 in which the tubular bodies 12 formed with the heat generating elements 13 are connected to each other. The tubular bodies 12 are connected to each other by, for example, welding. The output of the heat generating unit 200 can be changed by changing the number of the tubular body 12 formed with the heat generating element 13. Since the heat generating unit 200 has a gap between each heat generating element 13, even when the tubular body 12 is thermally expanded, damage to each heat generating element 13 is prevented.

The heat generating element production apparatus 150 can be reduced in size as a whole by being configured to carry in a plurality of short tubular body 12 having lengths of, for example, about 50 cm to 2 m. The heat generating unit 200 may be configured by connecting short tubular bodies 12 formed with the heat generating elements 13 to each other.

The heat generating element production apparatus 150 is not limited to one that produces the heat generating element 13 having a configuration in which the multilayer film 58 is formed on the base 57. The heat generating element production apparatus may be one for producing the heat generating element 133 having a configuration in which the multilayer film 134 is formed on the base 57 or one for producing the heat generating element 143 having a configuration in which the multilayer film 144 is formed on the base 57.

The heat generating element production apparatus for producing the heat generating element 133 includes the first layer forming chamber 155 and the second layer forming chamber 156, and further includes a third layer forming chamber having a third layer deposition sputter electrode for forming the third layer 135 on the base 57. The third layer deposition sputter electrode has a target material of a hydrogen storage metal or a hydrogen storage alloy forming the third layer 135. In the third layer deposition sputter electrode, similarly to the first layer deposition sputter electrode or the second layer deposition sputter electrode, the thickness of the third layer 135 can be controlled by adjusting the magnitude of the DC power and the rotation speed of the tubular body 12.

The heat generating element production apparatus for producing the heat generating element 143 includes the first layer forming chamber 155, the second layer forming chamber 156, and the third layer forming chamber, and further includes a fourth layer forming chamber having a fourth layer deposition sputter electrode for forming the fourth layer 145 on the base 57. The fourth layer deposition sputter electrode has a target material of a hydrogen storage metal or a hydrogen storage alloy forming the fourth layer 145. In the fourth layer deposition sputter electrode, similarly to the first layer deposition sputter electrode or the second layer deposition sputter electrode, the thickness of the fourth layer 145 can be controlled by adjusting the magnitude of the DC power and the rotation speed of the tubular body 12.

The thickness of the base 57 constituting the heat generating elements 13, 133, 143 is not particularly limited and can be appropriately changed. A heat generating element having a film shape (hereinafter referred to as a film-shaped heat generating element) can be formed by thinning the base 57 into a film shape and providing the multilayer film 58, 134, 144 on the film-shaped base 57. Hereinafter, the film-shaped heat generating element will be described in detail.

Figure 24:
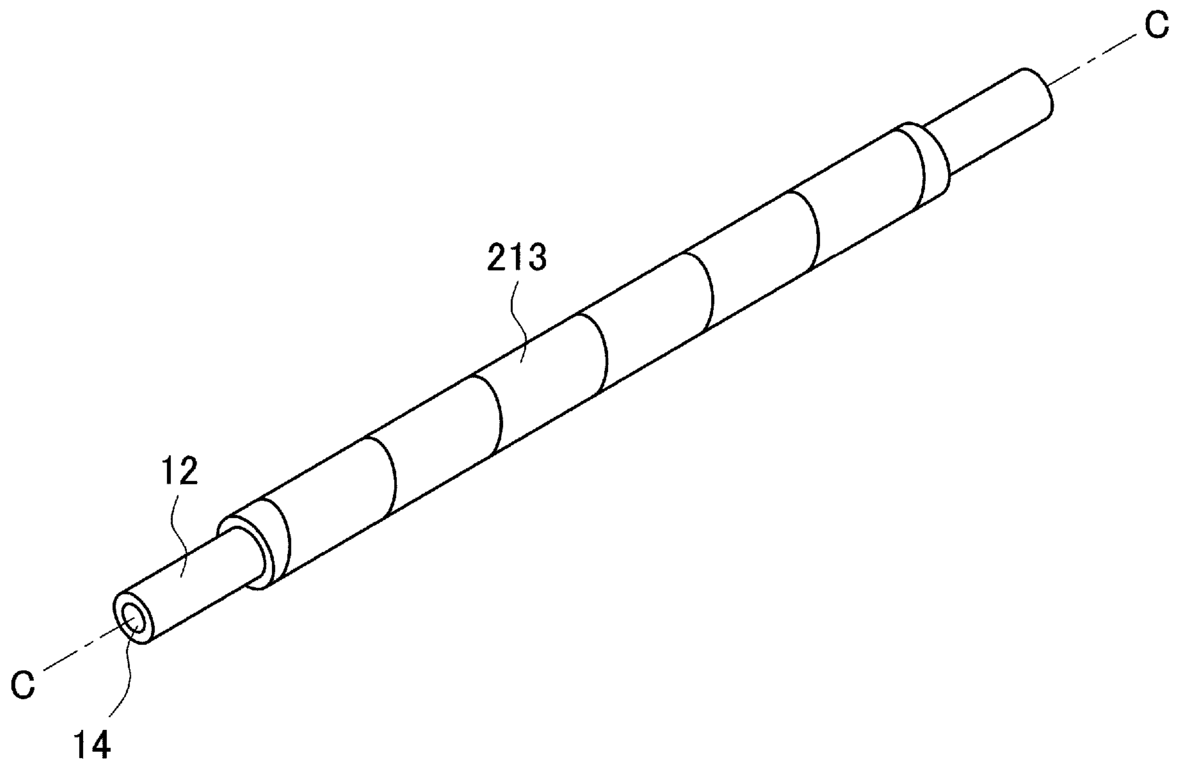
FIG. 24 is a perspective view of a film-shaped heat generating element.

As shown in FIG. 24, a film-shaped heat generating element 213 is wrapped around the outer surface of the tubular body 12. Although the film-shaped heat generating element 213 is spirally wound around the outer surface of the tubular body 12 without a gap in FIG. 24, it may be spirally wound around the outer surface of the tubular body 12 with a gap. In addition, the film-shaped heat generating element 213 may be spirally wound around the outer surface of the tubular body 12 such that at least a portion of the film-shaped heat generating elements 213 adjacent to each other in the direction of the central axis C of the tubular body 12 overlaps in the radial direction of the tubular body 12.

The film-shaped heat generating element 213 has the same structure as the heat generating element 13 (see FIG. 5). That is, the film-shaped heat generating element 213 includes the base 57 and the multilayer film 58. The base 57 and the multilayer film 58 constituting the film-shaped heat generating element 213 have a film shape.

The thickness of the base 57 is preferably within a range of 1 μm or more and 5000 μm or less, and more preferably within a range of 100 μm or more and 600 μm or less. The thickness of the multilayer film 58 is preferably within a range of 0.02 μm or more and 10 μm or less, and more preferably within a range of 2 μm or more and 6 μm or less. The thickness of the film-shaped heat generating element 213 is preferably within a range of 1.02 μm or more and 5010 μm or less, and more preferably within a range of 102 μm or more and 606 μm or less. The thickness of the base 57, the thickness of the multilayer film 58, and the thickness of the film-shaped heat generating element 213 are not limited to the above-described values, and can be appropriately designed so that a heat generating device using the film-shaped heat generating element 213 can obtain a desired output.

In this example, the film-shaped heat generating element 213 has the same structure as the heat generating element 13, but may have the same structure as the heat generating element 133 (see FIG. 19), that is, may have the base 57 and the multilayer film 134. Further, the film-shaped heat generating element 213 may have the same structure as the heat generating element 143 (see FIG. 20), that is, may have the base 57 and the multilayer film 144. The multilayer film 134 or the multilayer film 144 constituting the film-shaped heat generating element 213 has a film shape.

The film-shaped heat generating element 213 and the tubular body 12 are joined by, for example, spot-welding. For example, the film-shaped heat generating element 213 and the tubular body 12 are joined to each other by spot-welding the film-shaped heat generating element 213 at equal intervals in the direction of the central axis C of the tubular body 12 while winding the film-shaped heat generating element 213 around the outer surface of the tubular body 12. Although the portion to be spot-welded is heated to a high temperature, since the diameter of the portion to be spot-welded is about 1 mm and the time of the high-temperature state is several seconds, the characteristics of the film-shaped heat generating element 213 are not substantially deteriorated. Note that the place where the film-shaped heat generating element 213 and the tubular body 12 are joined is not particularly limited.

As described above, since the film-shaped heat generating element 213 has the base 57 and the multilayer film 58, it has the same effects as those of the heat generating element 13. That is, since the film-shaped heat generating element 213 generates heat using hydrogen, it does not generate greenhouse gases such as carbon dioxide. In addition, hydrogen used to generate heat in the film-shaped heat generating element 213 can be generated from water and is therefore inexpensive. Further, the heat generation of the film-shaped heat generating element 213 is considered safe because there is no chain reaction unlike a nuclear fission reaction. Therefore, the film-shaped heat generating element 213 can be used as an inexpensive, clean, and safe energy source. Further, since the base 57 and the multilayer film 58 are film-shaped, the film-shaped heat generating element 213 is excellent in followingness to a curved surface while having flexibility.

Figure 25:
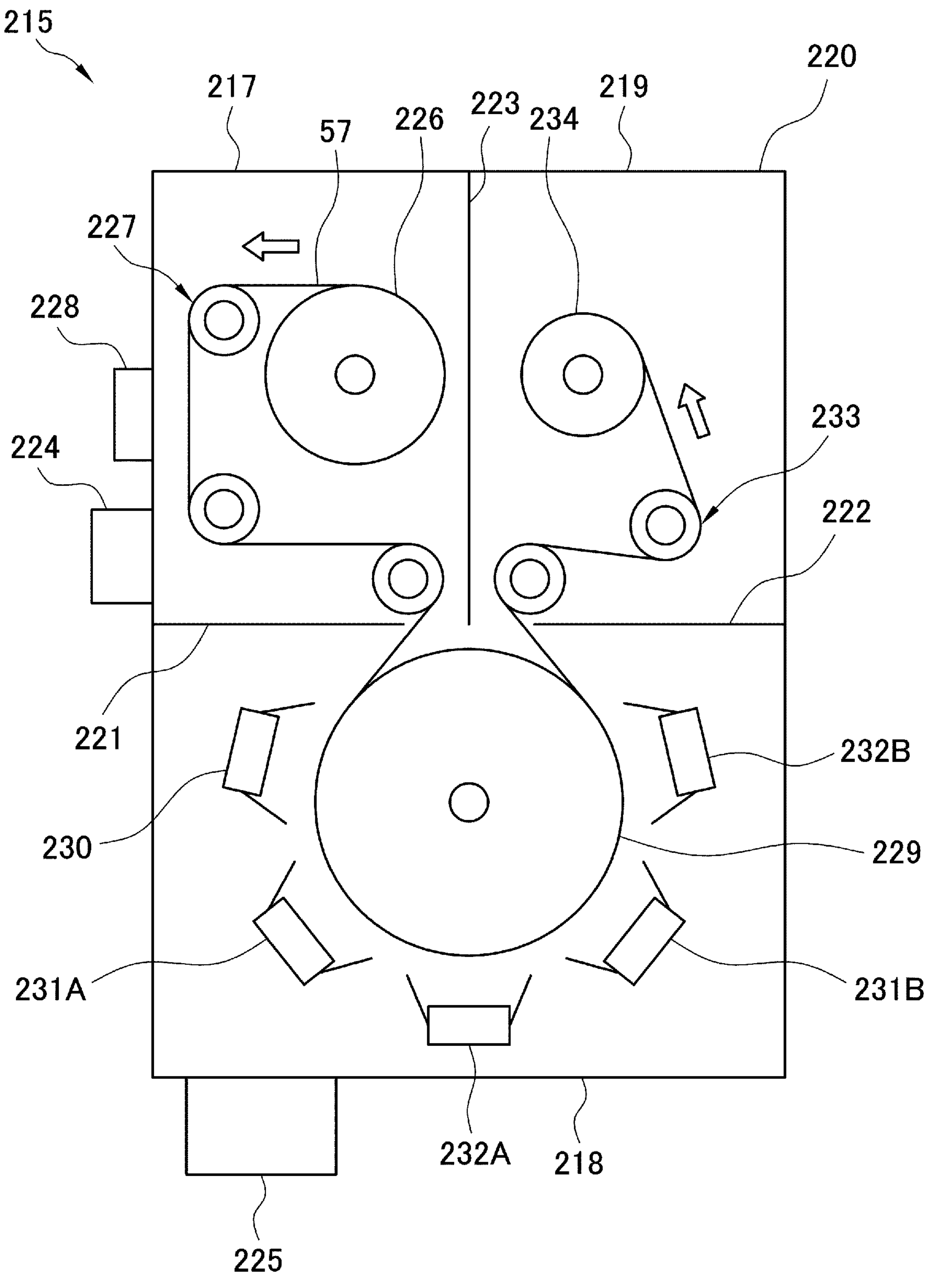
FIG. 25 is a schematic diagram of a film-shaped heat generating element production apparatus for producing the film-shaped heat generating element.

FIG. 25 shows a film-shaped heat generating element production apparatus 215 for producing the film-shaped heat generating element 213 using a sputtering method. In this example, the film-shaped heat generating element production apparatus 215 performs a DC magnetron sputtering method as the sputtering method. In the film-shaped heat generating element production apparatus 215, a multilayer film 58 is formed on the surface of a long film-shaped base 57 while the base 57 is continuously conveyed by a roller-to-roller system.

The film-shaped heat generating element production apparatus 215 includes an unwinding chamber 217 for unwinding the long film-shaped base 57, a film forming chamber 218 for forming the multilayer film 58 on the base 57, and a winding chamber 219 for winding the base 57 on which the multilayer film 58 is formed.

In this example, the film-shaped heat generating element production apparatus 215 is constituted by a single vacuum chamber 220, and includes a first partition plate 221 that partitions the unwinding chamber 217 and the film forming chamber 218, a second partition plate 222 that partitions the film forming chamber 218 and the winding chamber 219, and a third partition plate 223 that partitions the unwinding chamber 217 and the winding chamber 219.

The vacuum chamber 220 has a first vacuum generation unit 224 for evacuating the unwinding chamber 217 and a second vacuum generation unit 225 for evacuating the film forming chamber 218. The first vacuum generation unit 224 reduces the pressure inside the unwinding chamber 217 to, for example, about 1E-4 Pa. The second vacuum generation unit 225 reduces the pressure inside the film forming chamber 218 to a level lower than that of the unwinding chamber 217, for example, about 1E-5 Pa. As the first vacuum generation unit 224 and the second vacuum generation unit 225, for example, a dry pump, a turbo-molecular pump, or the like is used. Sputtering gas is introduced into the vacuum chamber 220 after the pressure is reduced. The sputtering gas is an argon (Ar) gas in this example, but a known gas may be used. The pressure of Ar inside the vacuum chamber 220 can be adjusted by adjusting the flow rate of Ar gas. The shape and material of the vacuum chamber 220 are not particularly limited as long as they can withstand a reduced pressure state.

The unwinding chamber 217 includes an unwinding roller 226 around which the long film-shaped base 57 is wound, a first conveyance roller unit 227 that conveys the base 57 unwound from the unwinding roller 226, and a heating unit 228 that heats the base 57 conveyed by the first conveyance roller unit 227. The unwinding roller 226 has a motor (not shown), and is rotated by driving of the motor. The first conveyance roller unit 227 includes, for example, a free roller and a tension measuring roller.

The heating unit 228 removes moisture adsorbed on the surface of the base 57 by heating the base 57 to a surface temperature of, for example, 200 to 350° C. The heating unit 228 is not particularly limited as long as it can heat the base 57 to a desired temperature. For example, a lamp heating method, an infrared heating method, an induction heating method, or the like can be used.

The film forming chamber 218 includes a film forming roller 229 for conveying the base 57 carried out from the unwinding chamber 217, a sputter etching electrode 230 for sputter etching the surface of the base 57, first layer deposition sputter electrodes 231A and 231B for forming the first layer 59 on the base 57, and second layer deposition sputter electrodes 232A and 232B for forming the second layer 60 on the base 57.

The film forming roller 229 has a motor (not shown), and is rotated by driving of the motor. Inside the film forming roller 229, a refrigerant whose temperature has been adjusted outside the vacuum chamber 220 is circulated. Therefore, in the film forming chamber 218, the base 57 is controlled to a constant temperature (for example, a temperature within a range of 50 to 300° C.). The tension based on the peripheral speed difference between the film forming roller 229 and the unwinding roller 226 is measured by the tension measuring roller of the first conveyance roller unit 227. Measurement data measured by the tension measuring roller is fed back to the unwinding roller 226, and the peripheral speed of the unwinding roller 226 is controlled.

The sputter etching electrode 230, the first layer deposition sputter electrodes 231A, 231B, and the second layer deposition sputter electrodes 232A, 232B are arranged at positions facing the surface of the base 57 conveyed by the film forming roller 229. The sputter etching electrode 230, the first layer deposition sputter electrodes 231A, 231B, and the second layer deposition sputter electrodes 232A, 232B have a shield plate on the front side facing the surface of the base 57.

By using the sputter etching electrode 230, for example, the flow rate of Ar gas is adjusted to set the Ar pressure to about 0.1 to 1 Pa, and RF of 13.56 MHz is applied to remove organic substances and metallic oxides on the surface of the base 57.

The first layer deposition sputter electrode 231A and the first layer deposition sputter electrode 231B have the same configuration. The first layer deposition sputter electrodes 231A, 231B have a target material (not shown) of a hydrogen storage metal or a hydrogen storage alloy forming the first layer 59. The front side of the target material faces the base 57. In this example, a magnet (not shown) is arranged on the rear side of the target material. By using the first deposition sputter electrodes A, 231B, for example, the flow rate of Ar gas is adjusted to set the Ar pressure to about 0.1 to 1 Pa, and the DC power of about 0.1 to 500 $kW/m^2$ is applied to form the first layer 59 on the base 57. The thickness of the first layer 59 can be controlled by adjusting the magnitude of the DC power and the conveyance speed of the base 57.

The second layer deposition sputter electrode 232A and the second layer deposition sputter electrode 232B have the same configuration. The second layer deposition sputter electrodes 232A, 232B have a target material (not shown) of a hydrogen storage metal, a hydrogen storage alloy, or ceramics forming the second layer 60. The front side of the target material faces the base 57. In this example, a magnet (not shown) is arranged on the rear side of the target material. By using the second layer deposition sputter electrodes 232A, 232B, for example, the flow rate of Ar gas is adjusted to set the Ar pressure to about 0.1 to 1 Pa, and the DC power of about 0.1 to 500 $kW/m^2$ is applied to form the second layer 60 on the base 57. When ceramics are used as the target material for forming the second layer 60, the second layer deposition sputter electrode 232A and the second layer deposition sputter electrode 232B are configured to apply RFs. The thickness of the second layer 60 can be controlled by adjusting the magnitude of the DC power and the conveyance speed of the base 57.

In FIG. 25, the traveling direction of the base 57 is indicated by an outline arrow. In FIG. 25, the first layer deposition sputter electrode 231A, the second layer deposition sputter electrode 232A, the first layer deposition sputter electrode 231B, and the second layer deposition sputter electrode 232B are arranged in this order from the upstream side to the downstream side in the traveling direction of the base 57. Therefore, the first layer deposition sputter electrode 231A forms the first layer 59 on the surface of the base 57. The second layer deposition sputter electrode 232A forms the second layer 60 on the surface of the first layer 59 formed by the first layer deposition sputter electrode 231A. The first layer deposition sputter electrode 231B forms the first layer 59 on the surface of the second layer 60 formed by the second layer deposition sputter electrode 232A. The second layer deposition sputter electrode 232B forms the second layer 60 on the surface of the first layer 59 formed by the first layer deposition sputter electrode 231B. In this way, in the film forming chamber 218, the multilayer film 58 composed of the first layer 59 and the second layer 60 is formed on the surface of the base 57. In the following description, the first layer deposition sputter electrode 231A and the first layer deposition sputter electrode 231B are referred to as the first layer deposition sputter electrode 231 when they are not distinguished from each other, and the second layer deposition sputter electrode 232A and the second layer deposition sputter electrode 232B are referred to as the second layer deposition sputter electrode 232 when they are not distinguished from each other. When one or more first layer deposition sputter electrodes 231 and one or more second layer deposition sputter electrodes 232 are provided, the multilayer film 58 having one or more first layers 59 and one or more second layers 60, respectively, and having one or more heterogeneous material interfaces 61 formed therein is obtained. The number of layers of the first layer 59, the number of layers of the second layer 60, and the number of the heterogeneous material interfaces 61 can be changed by changing the number of the first layer deposition sputter electrodes 231 and the number of the second layer deposition sputter electrodes 232.

The winding chamber 219 includes a second conveyance roller unit 233 that conveys the base 57 carried out from the film forming chamber 218, and a winding roller 234 that winds the base 57 conveyed by the second conveyance roller unit 233. The film-shaped material wound by the winding roller 234 is the film-shaped heat generating element 213. The second conveyance roller unit 233 includes, for example, a free roller and a tension measuring roller. The winding roller 234 has a motor (not shown), and is rotated by driving of the motor. The tension based on the peripheral speed difference between the winding roller 234 and the film forming roller 229 is measured by the tension measuring roller of the second conveyance roller unit 233. Measurement data measured by the tension measuring roller is fed back to the winding roller 234, and the peripheral speed of the winding roller 234 is controlled. The film-shaped heat generating element 213 is obtained by returning the inside of the vacuum chamber 220 to the atmosphere pressure and taking out the winding roller 234 from the winding chamber 219.

As described above, in the film-shaped heat generating element production apparatus 215, the first layer 59 and the second layer 60 can be continuously formed in a vacuum state on the base 57 because the first layer deposition sputter electrode 231 and the second layer deposition sputter electrode 232 are alternately arranged from the upstream side to the downstream side in the traveling direction of the long film-shaped base 57. Therefore, in the film-shaped heat generating element production apparatus 215, it is possible to produce a long film-shaped heat generating element 213 in which only the heterogeneous material interface 61 is formed without forming a natural oxide film between the first layer 59 and the second layer 60. The long film-shaped heat generating element 213 has flexibility and excellent followingness to a curved surface such as an uneven shape. Further, since the long film-shaped heat generating element 213 can be used by being cut into desired lengths, it can be applied to more various uses.

A plurality of short film-shaped heat generating elements 213 may be prepared by cutting the long film-shaped heat generating element 213 into predetermined lengths, and the plurality of short film-shaped heat generating elements 213 may be provided on the outer surface of one tubular body 12 at intervals from each other.

The film-shaped heat generating element production apparatus 215 can perform a continuous processing in which heating by the heating unit 228, sputter etching by the sputter etching electrode 230, and film formation by the first layer deposition sputter electrode 231 and the second layer deposition sputter electrode 232 are continuously performed, and a step processing in which heating by the heating unit 228, sputter etching by the sputter etching electrode 230, and film formation by the first layer deposition sputter electrode 231 and the second layer deposition sputter electrode 232 are separately performed. In the case of the continuous processing, heating, sputter etching, and film formation are continued until film formation on one long film-shaped base 57 is completed. In the case of the step processing, for example, by performing ON/OFF of the power supply or adjustment of the input power, the time for performing heating, sputter etching, and film formation can be independently set. Further, the time for film formation may be set by opening and closing a shutter for shielding the target material.

The film-shaped heat generating element production apparatus 215 is not limited to one that produces the film-shaped heat generating element 213 having a configuration in which the multilayer film 58 is formed on the base 57. The film-shaped heat generating element production apparatus may be a production apparatus for producing a film-shaped heat generating element having a configuration in which the multilayer film 134 or the multilayer film 144 is formed on the base 57.

The film-shaped heat generating element production apparatus for producing the film-shaped heat generating element having a configuration in which the multilayer film 134 is formed on the base 57 further includes a third layer deposition sputter electrode for forming the third layer 135 on the base 57 in addition to the first layer deposition sputter electrode 231 and the second layer deposition sputter electrode 232. The third layer deposition sputter electrode has a target material of a hydrogen storage metal or a hydrogen storage alloy forming the third layer 135. In the third layer deposition sputter electrode, similarly to the first layer deposition sputter electrode 231 or the second layer deposition sputter electrode 232, the thickness of the third layer 135 can be controlled by adjusting the magnitude of the DC power and the conveyance speed of the base 57.

The film-shaped heat generating element production apparatus for producing the film-shaped heat generating element having a configuration in which the multilayer film 144 is formed on the base 57 further includes a fourth layer deposition sputter electrode for forming the fourth layer 145 on the base 57 in addition to the first layer deposition sputter electrode 231, the second layer deposition sputter electrode 232, and the third layer deposition sputter electrode. The fourth layer deposition sputter electrode has a target material of a hydrogen storage metal or a hydrogen storage alloy forming the fourth layer 145. In the fourth layer deposition sputter electrode, similarly to the first layer deposition sputter electrode 231 or the second layer deposition sputter electrode 232, the thickness of the fourth layer 145 can be controlled by adjusting the magnitude of the DC power and the conveyance speed of the base 57.

Figure 26:
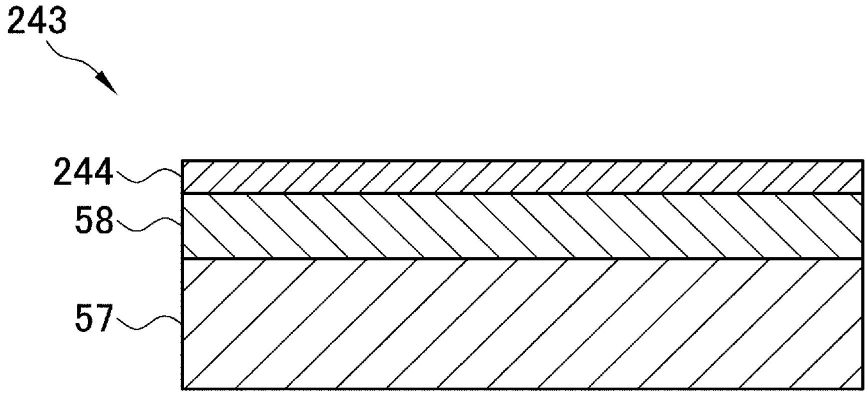
FIG. 26 is a cross-sectional view showing a structure of the film-shaped heat generating element having a passivation film.

In addition to the base 57 and the multilayer film 58, a film-shaped heat generating element 243 shown in FIG. 26 further includes a passivation film 244 provided on the surface of the multilayer film 58 to protect the surface of the multilayer film 58. The passivation film 244 is made of a hydrogen-permeable material such as $SiO_2$ or SiN. The passivation film 244 can be formed by, for example, a chemical vapor deposition (CVD) method. Since the film-shaped heat generating element 243 has the passivation film 244, damage to the multilayer film 58 is suppressed. The passivation film 244 may be provided on the surface of the multilayer film 134 or the multilayer film 144.

REFERENCE SIGNS LIST

10, 70, 80, 90, 100, 120 heat generating device
11 sealed container
12 tubular body
13, 133, 143 heat generating element
14 flow path
15 fluid circulation unit
16 control unit
26 hollow portion
30 circulation line
32, 92 cooling unit
33 heating unit
45 external fluid line
55, **55*a* to 55*c*** heat generating module
57 base
58, 134, 144 multilayer film
59 first layer
60 second layer
61, 136, 146 heterogeneous material interface
71, 104 steam turbine (fluid utilization device)
79, 89, 119, 129 heat utilization system
101 heat recovery line
135 third layer
145 fourth layer
150 heat generating element production apparatus
213, 243 film-shaped heat generating element
215 film-shaped heat generating element production apparatus

The invention claimed is:

1. A heat generating device comprising:

a hollow sealed container;

a tubular body provided in a hollow portion formed by an inner surface of the sealed container;

a heat generating element provided on an outer surface of the tubular body and configured to generate heat by occluding and discharging hydrogen contained in a hydrogen-based gas supplied to the hollow portion; and a flow path formed by an inner surface of the tubular body and through which configured to allow a fluid that exchanges heat with the heat generating element to flow, wherein the heat generating element includes a base made of a hydrogen storage metal, a hydrogen storage alloy, or a proton conductor, and a multilayer film provided on the base; and the multilayer film has a first layer made of a hydrogen storage metal or a hydrogen storage alloy and having a thickness of less than 1000 nm, and a second layer made of a hydrogen storage metal or a hydrogen storage alloy, which is different from that of the first layer, or ceramics and having a thickness of less than 1000 nm.

2. The heat generating device according to claim 1, further comprising:

a fluid circulation unit having a circulation line that is connected to the flow path and is configured to circulate the fluid between an inside and an outside of the tubular body;

a cooling unit that is provided in the circulation line and is configured to cool the fluid;

a heating unit that is provided in the circulation line and is configured to heat the fluid; and a control unit that drives the cooling unit and performs temperature decrease control to decrease the temperature of the heat generating element by the cooled fluid and drives the heating unit and performs temperature increase control to increase the temperature of the heat generating element by the heated fluid.

3. The heat generating device according to claim 2, wherein the fluid circulation unit further includes an external fluid line provided on an outer surface of the sealed container and connected to the circulation line, and through which configured to allow a part of the fluid to flow.

4. The heat generating device according to claim 1, wherein the first layer is made of any one of Ni, Pd, Cu, Mn, Cr, Fe, Mg, Co, and an alloy thereof, and the second layer is made of any one of Ni, Pd, Cu, Mn, Cr, Fe, Mg, Co, an alloy thereof, and SiC.

5. The heat generating device according to claim 4, wherein the multilayer film has a third layer made of a hydrogen storage metal, a hydrogen storage alloy, or ceramics different from those of the first layer and the second layer and having a thickness of less than 1000 nm, in addition to the first layer and the second layer.

6. The heat generating device according to claim 5, wherein the third layer is made of any one of CaO, $Y_2O_3$, TiC, $LaB_6$, SrO, and BaO.

7. The heat generating device according to claim 6, wherein the multilayer film has a fourth layer made of a hydrogen storage metal or a hydrogen storage alloy different from those of the first layer, the second layer, and the third layer and having a thickness of less than 1000 nm, in addition to the first layer, the second layer, and the third layer.

8. The heat generating device according to claim 7, wherein the fourth layer is made of any one of Ni, Pd, Cu, Cr, Fe, Mg, Co, an alloy thereof, SiC, Cao, $Y_2O_3$, TiC, $LaB_6$, SrO, and BaO.

9. The heat generating device according to claim 1, wherein the base and the multilayer film have a film shape, and the heat generating element is wound around an outer surface of the tubular body.

10. A heat utilization system comprising:

the heat generating device according to claim 1; and a fluid utilization device that utilizes the fluid heated by the heat generating element.

* * * * *